United States Patent
Pheiffer et al.

(10) Patent No.: US 11,506,505 B2
(45) Date of Patent: Nov. 22, 2022

(54) METHODS AND APPARATUS FOR DETERMINING A VEHICLE PATH

(71) Applicant: The Boeing Company, Chicago, IL (US)

(72) Inventors: Brian K. Pheiffer, Palos Verdes Estates, CA (US); Neal Carlson, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 16/274,535

(22) Filed: Feb. 13, 2019

(65) Prior Publication Data

US 2020/0256686 A1    Aug. 13, 2020

(51) Int. Cl.
| | | |
|---|---|---|
| *G01C 21/34* | (2006.01) | |
| *G05D 1/08* | (2006.01) | |
| *G05D 1/00* | (2006.01) | |
| *G05D 1/10* | (2006.01) | |
| *G05D 3/00* | (2006.01) | |

(52) U.S. Cl.
CPC ..... *G01C 21/3415* (2013.01); *G01C 21/3446* (2013.01); *G05D 1/0088* (2013.01); *G05D 1/08* (2013.01); *G05D 1/10* (2013.01); *G05D 3/00* (2013.01)

(58) Field of Classification Search
CPC ............ G01C 21/3415; G01C 21/3446; G05D 1/0088; G05D 1/08; G05D 3/00; G05D 1/10
See application file for complete search history.

(56) References Cited

U.S. PATENT DOCUMENTS

| | | | | |
|---|---|---|---|---|
| 5,311,435 | A * | 5/1994 | Yocum | B64G 1/244 701/13 |
| 11,079,492 | B1 * | 8/2021 | Stumm | G01S 7/4808 |
| 2012/0239191 | A1 * | 9/2012 | Versteeg | G06N 3/004 700/246 |
| 2013/0325244 | A1 * | 12/2013 | Wang | G06T 11/00 701/26 |
| 2015/0219747 | A1 * | 8/2015 | Thevenet | G01S 5/0247 342/355 |
| 2017/0074689 | A1 * | 3/2017 | Lubberhuizen | G01D 5/56 |

(Continued)

FOREIGN PATENT DOCUMENTS

| | | | | |
|---|---|---|---|---|
| CN | 111380526 A | * | 7/2020 | G01C 21/20 |
| WO | WO-2016008026 A1 | * | 1/2016 | G05B 6/02 |
| WO | WO-2020133118 A1 | * | 7/2020 | G05D 1/0206 |

*Primary Examiner* — Hunter B Lonsberry
*Assistant Examiner* — Jay Khandpur
(74) *Attorney, Agent, or Firm* — Perman & Green, LLP

(57) ABSTRACT

A method for generation of a vehicle path for a vehicle. The method includes, using an excursion planning processor to perform generating a grid of attitude constraint masks, wherein each attitude constraint mask corresponds to a respective possible attitude of the vehicle. The method also includes defining a distance function between two points on a vehicle path, such that the vehicle path defines a change in orientation of the vehicle, determining a vehicle path component, of the vehicle path, between the two points having a selected cost, selecting a vehicle path in the grid of attitude constraint masks from the vehicle path component, and generating an excursion plan so that the vehicle travels along the vehicle path.

20 Claims, 12 Drawing Sheets

(56) References Cited

U.S. PATENT DOCUMENTS

| 2017/0193894 A1* | 7/2017 | Hsu | G09G 3/34 |
| 2019/0145778 A1* | 5/2019 | Huang | G01C 21/20 |
| | | | 701/3 |
| 2019/0291863 A1* | 9/2019 | Lyasoff | B64D 31/06 |
| 2020/0064851 A1* | 2/2020 | Wilkinson | G05D 1/0088 |

* cited by examiner

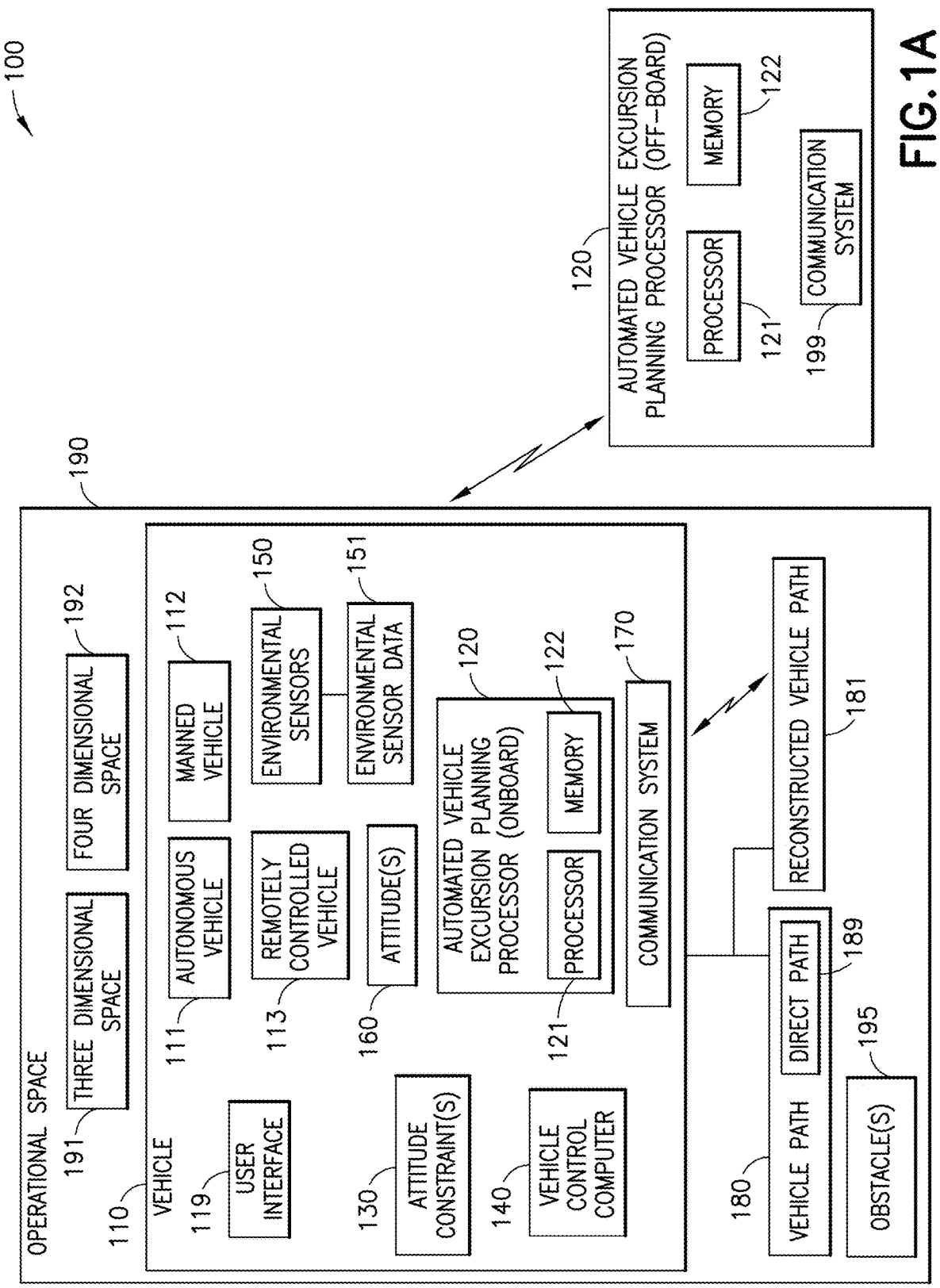

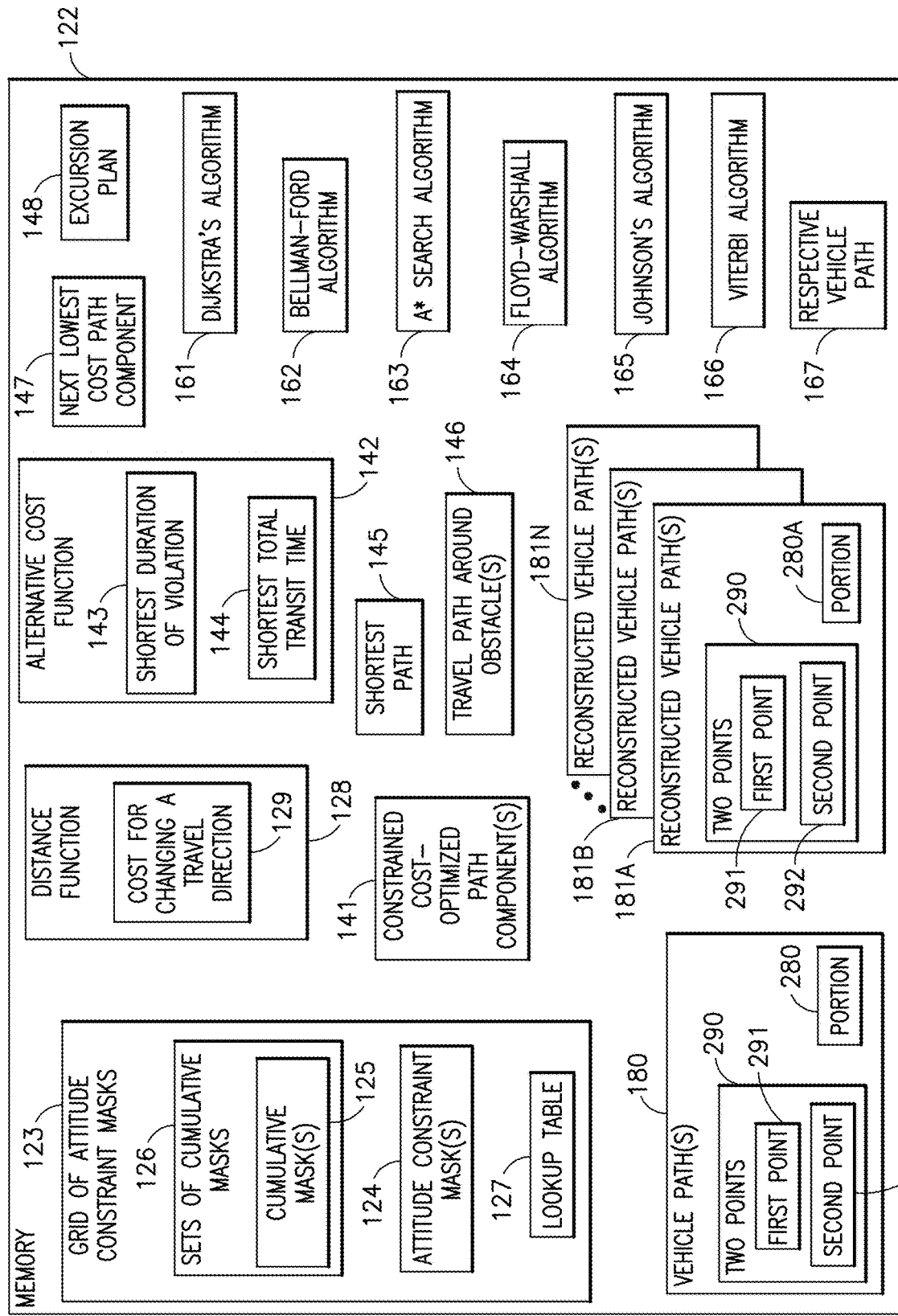

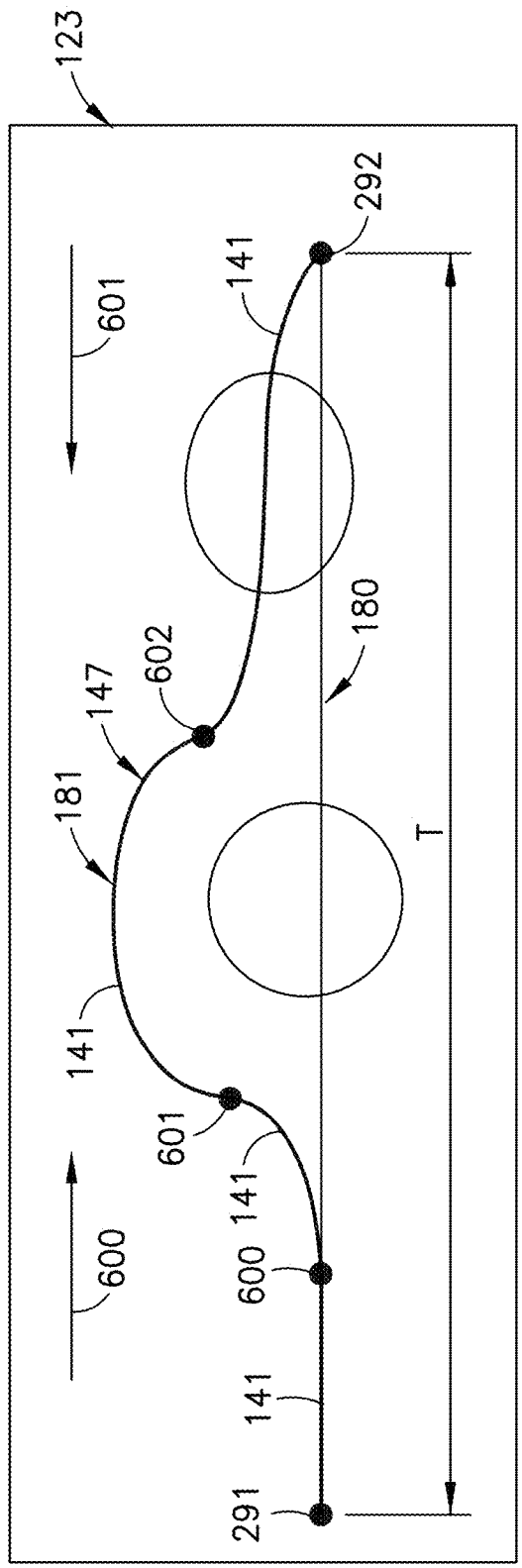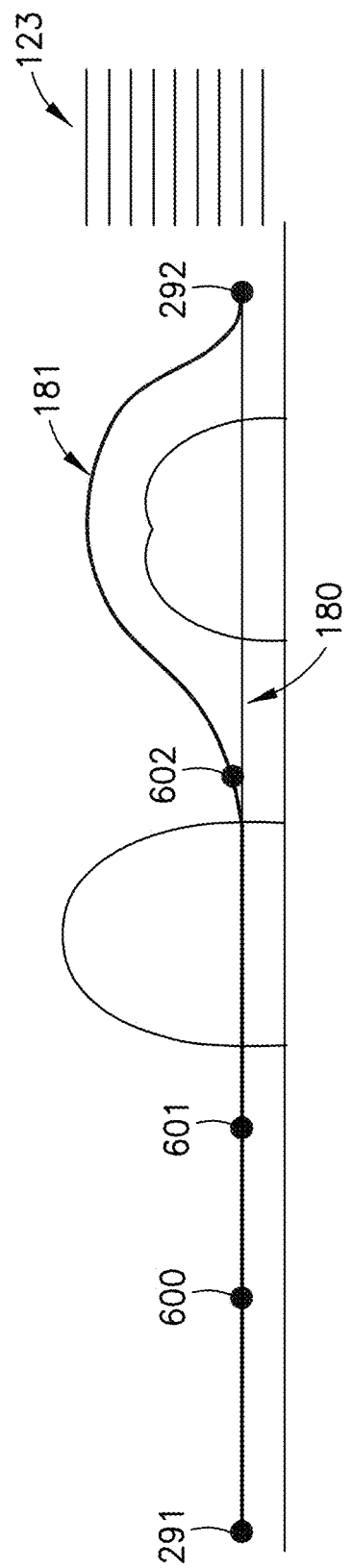

METHODS AND APPARATUS FOR DETERMINING A VEHICLE PATH

BACKGROUND

1. Field

The exemplary embodiments generally relate to vehicle control systems and more particularly to vehicle control systems configured to optimize vehicle movement paths changing orientation of the vehicle according to constraints of the vehicle.

2. Brief Description of Related Developments

Generally, known and/or unknown constraints, such as physical, kinematic, and geographical constraints, are analyzed when determining a rotational path (referred to herein as a "path") for navigating a vehicle from a first orientation to a second orientation. Generally, the path or paths are generated prior to the vehicle departing from the first orientation where the constraints may result in inefficiencies while the vehicle is conducting an excursion.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a method for generation of a vehicle path for a vehicle, the method comprising: using an excursion planning processor to perform the steps of: generating a grid of attitude constraint masks, wherein each attitude constraint mask corresponds to a respective possible attitude of the vehicle; defining a distance function between two points on a vehicle path, such that the vehicle path defines a change in orientation of the vehicle; determining a vehicle path component, of the vehicle path, between the two points having a selected cost; selecting a vehicle path in the grid of attitude constraint masks from the vehicle path component; and generating an excursion plan so that the vehicle travels along the vehicle path.

Another example of the subject matter according to the present disclosure relates to a system for controlling a vehicle, the system (100) comprising: a vehicle; and an excursion planning processor communicably coupled to the vehicle, the excursion planning processor being configured to: generate a grid of attitude constraint masks, wherein each attitude constraint mask corresponds to a respective possible attitude of the vehicle, define a distance function between two points on the vehicle path, determine a vehicle path component, of the vehicle path, between the two points, having a selected cost, selecting a vehicle path in the grid of attitude constraint masks from the vehicle path component; and the excursion planning processor is configured to generate an excursion plan so that the vehicle travels along the vehicle path.

Still another example of the subject matter according to the present disclosure relates to a method for generation of a vehicle path component for a vehicle, the method comprising: using an excursion planning processor to perform the steps of: generating a grid of attitude constraint masks, wherein each attitude constraint mask corresponds to a respective possible attitude of the vehicle; determining a direct path between two points and determining if intermediate points along a great circle path between the two points violates the grid of attitude constraint masks; wherein: where the direct path satisfies the grid of attitude constraint masks the excursion planning processor generates an excursion plan so that the vehicle travels along the direct path, and where the direct path violates the grid of attitude constraint masks, the method further comprises: using the excursion planning processor to perform the steps of: defining a distance function between two points on the vehicle path to include a cost for changing a travel direction of the vehicle and determining a vehicle path component, of the vehicle path, between the two points having a selected cost; selecting the vehicle path through the grid of attitude constraint masks from the vehicle path component; determining if a portion of the vehicle path violates the grid of attitude constraint masks; and where the portion of the vehicle path violates the grid of attitude constraint masks determining at least one next lowest cost vehicle path component between the two points, and re-constructing the vehicle path through the grid of attitude constraint masks with the at least one next lowest cost vehicle path component and determining if a portion of the reconstructed vehicle path violates the grid of attitude constraint masks; and generating the excursion plan so that the vehicle travels along the reconstructed vehicle path.

BRIEF DESCRIPTION OF THE DRAWINGS

Figure 1C:
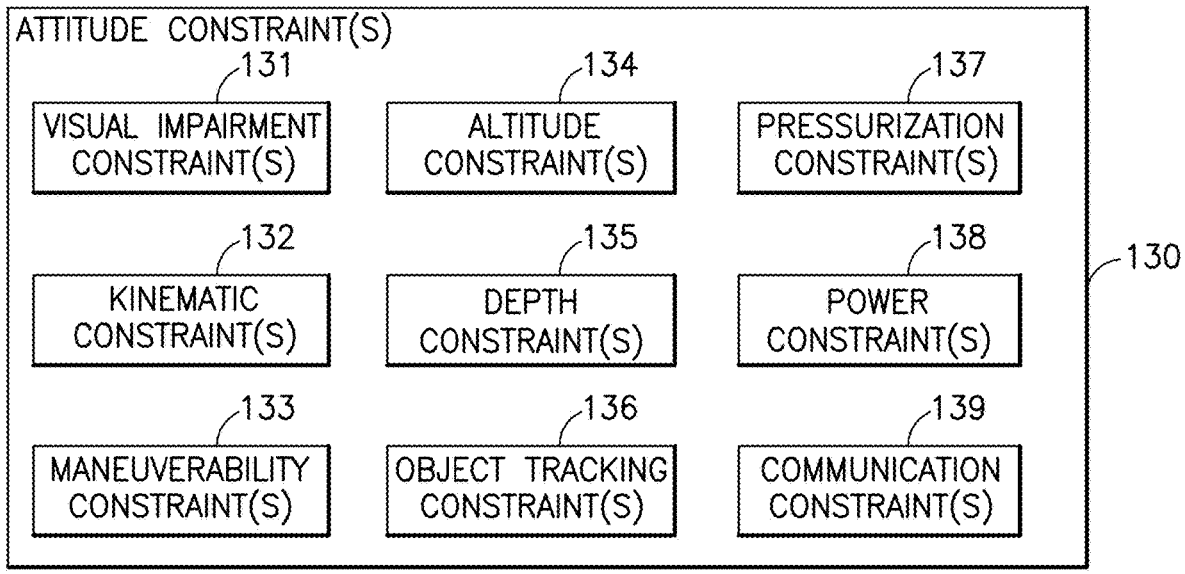
Figure 1D:
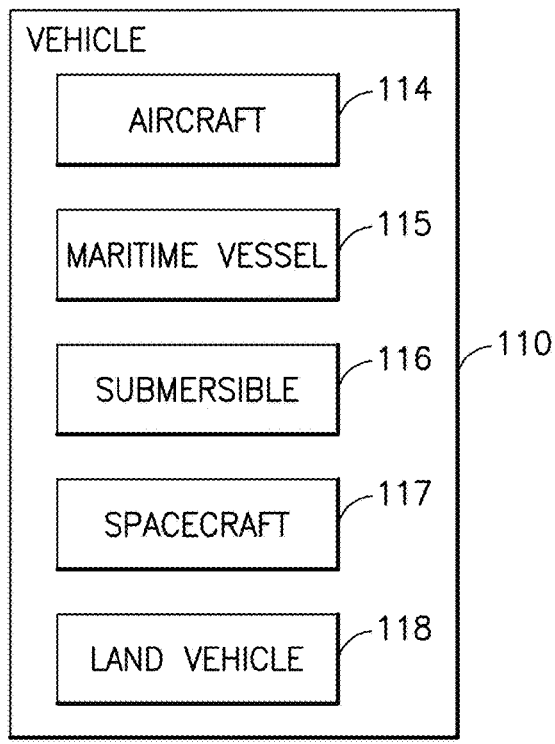
Figure 2:
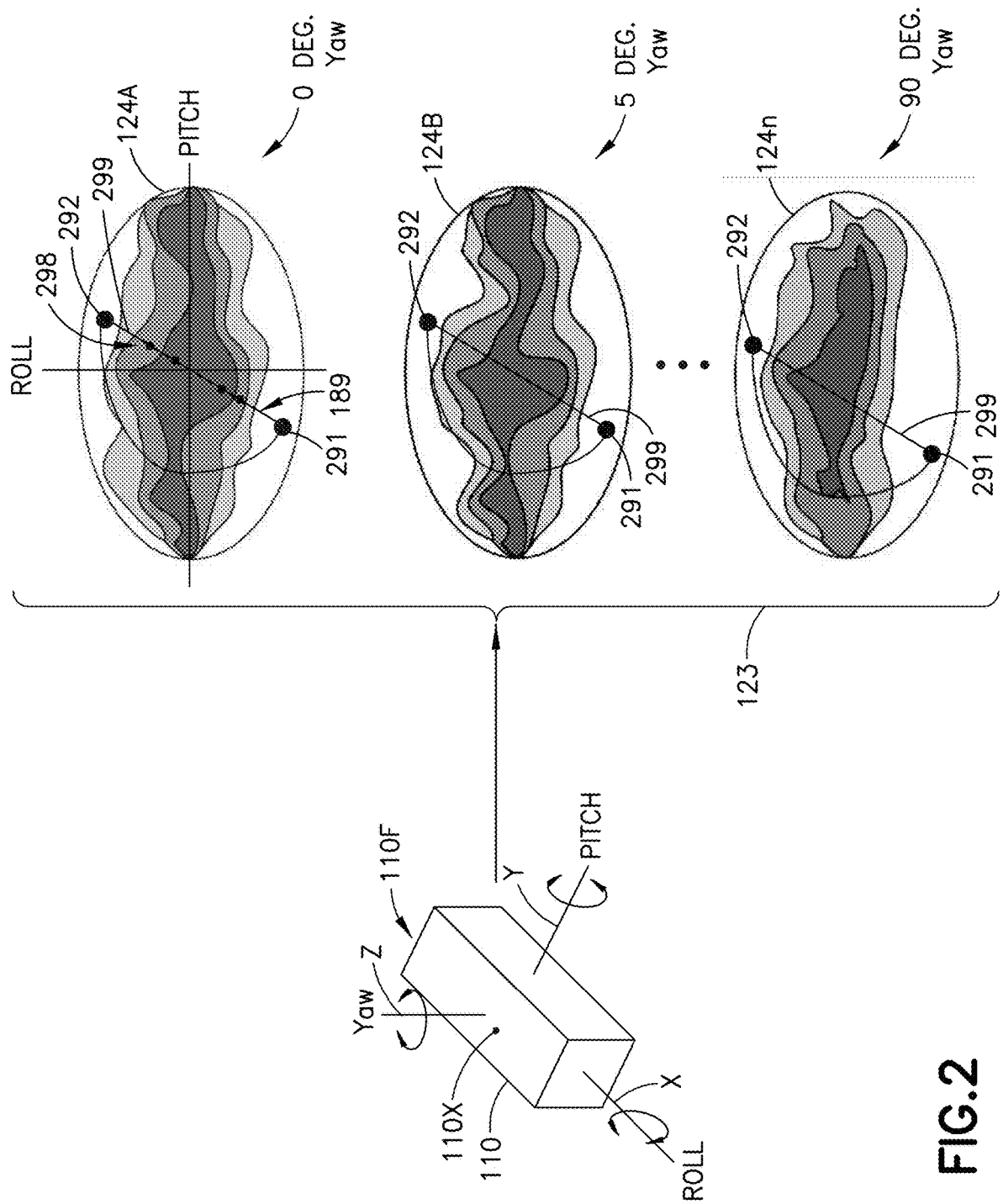
Figure 3A:
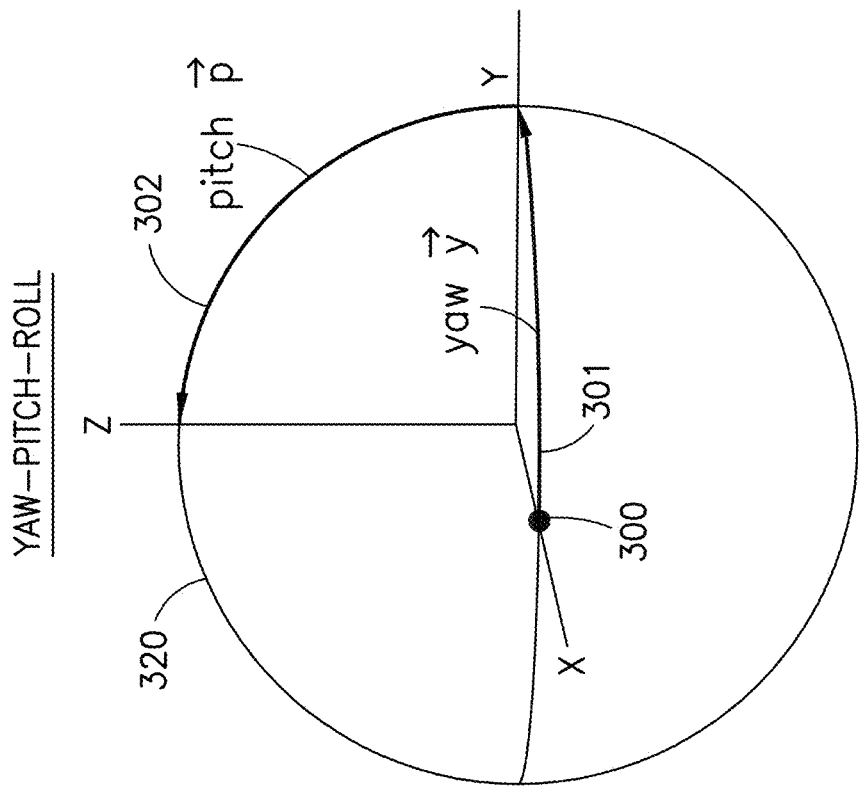
Figure 3B:
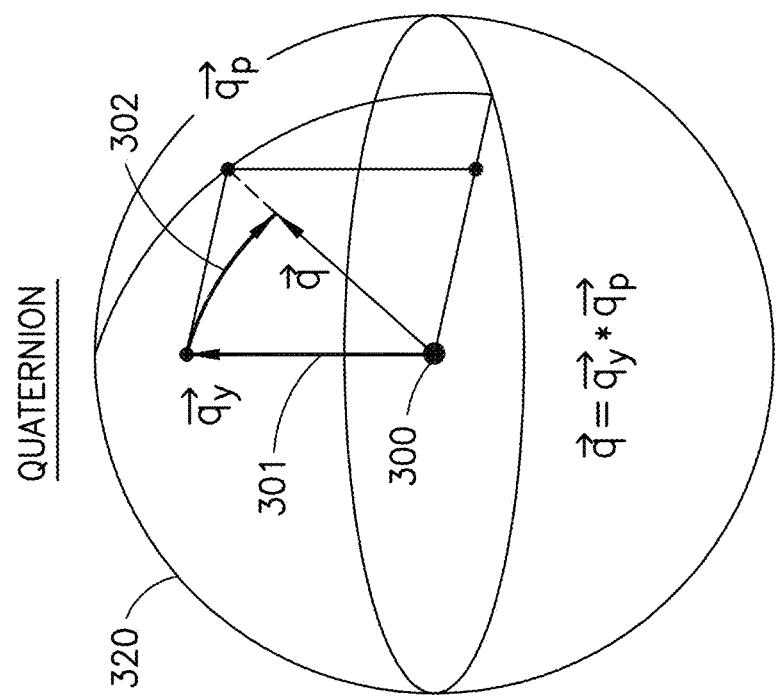
Figure 4:
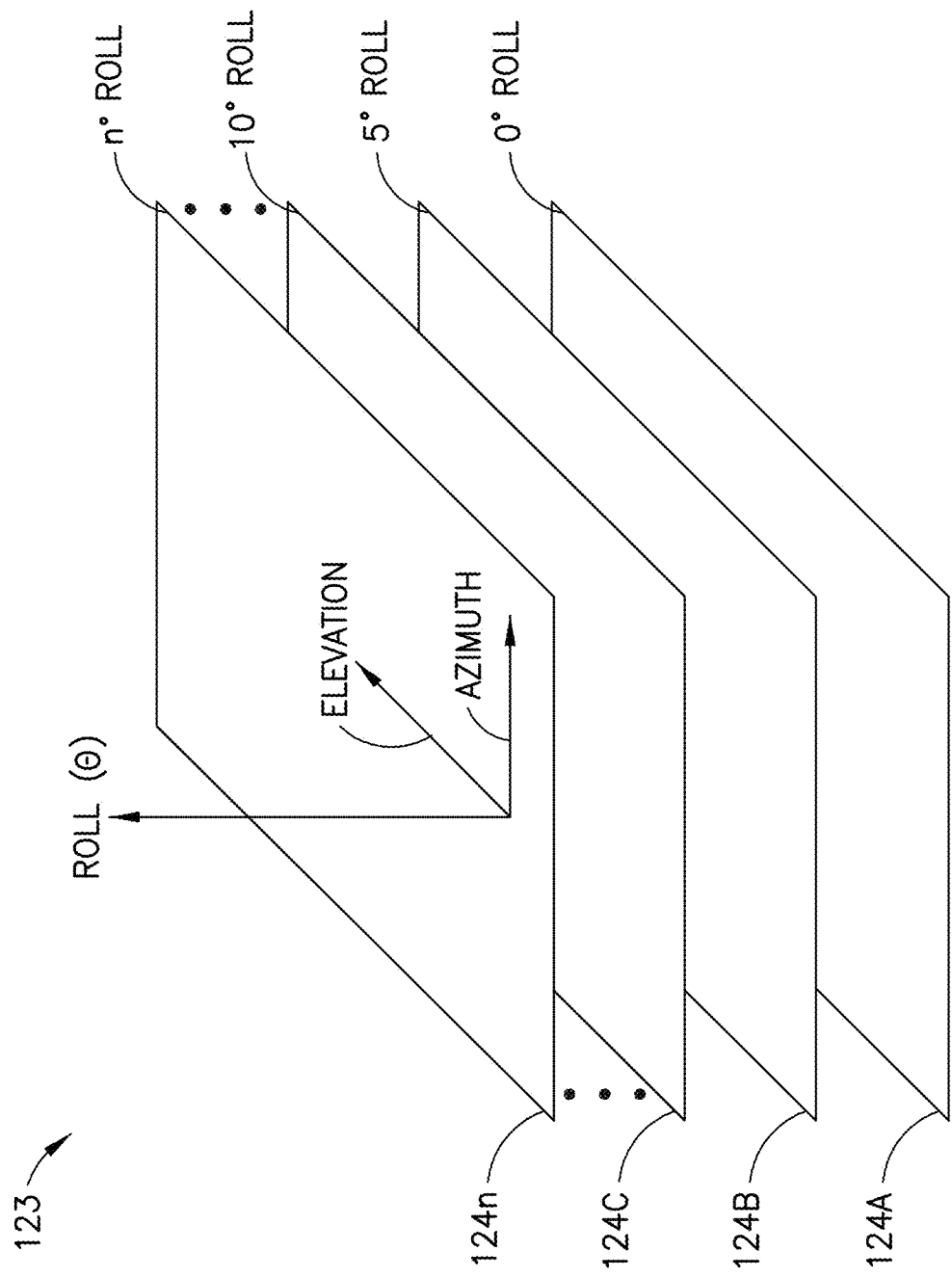
Figure 5:
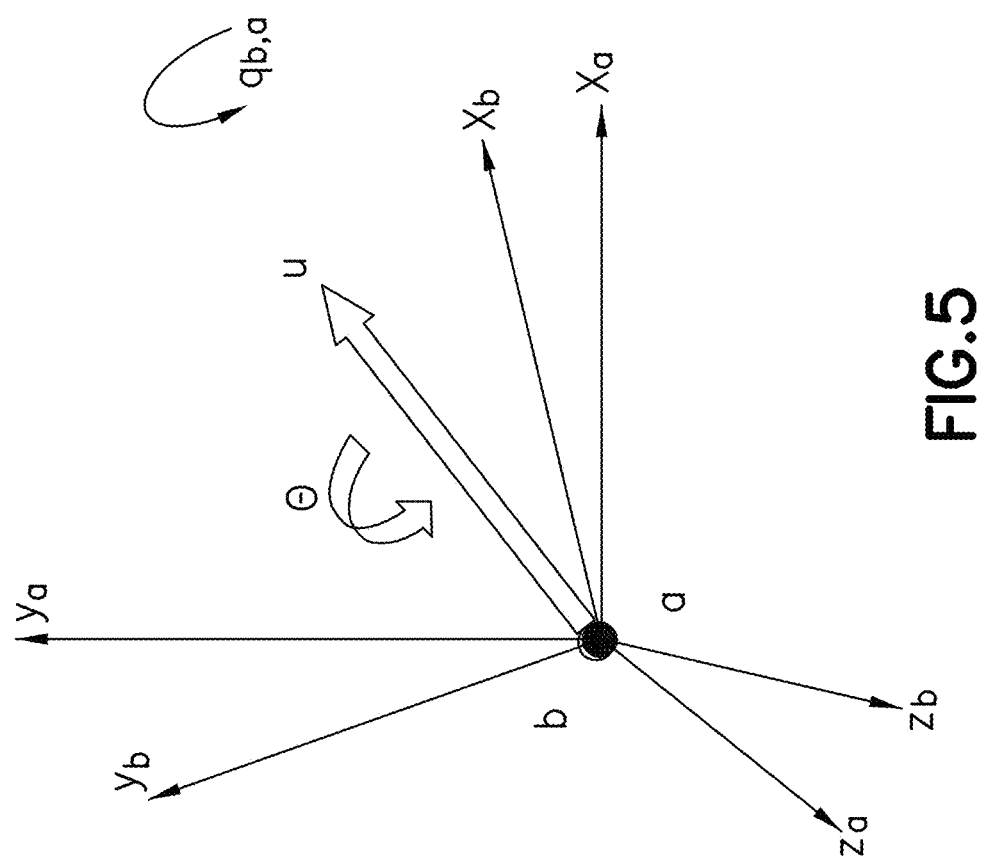
Figure 6A:
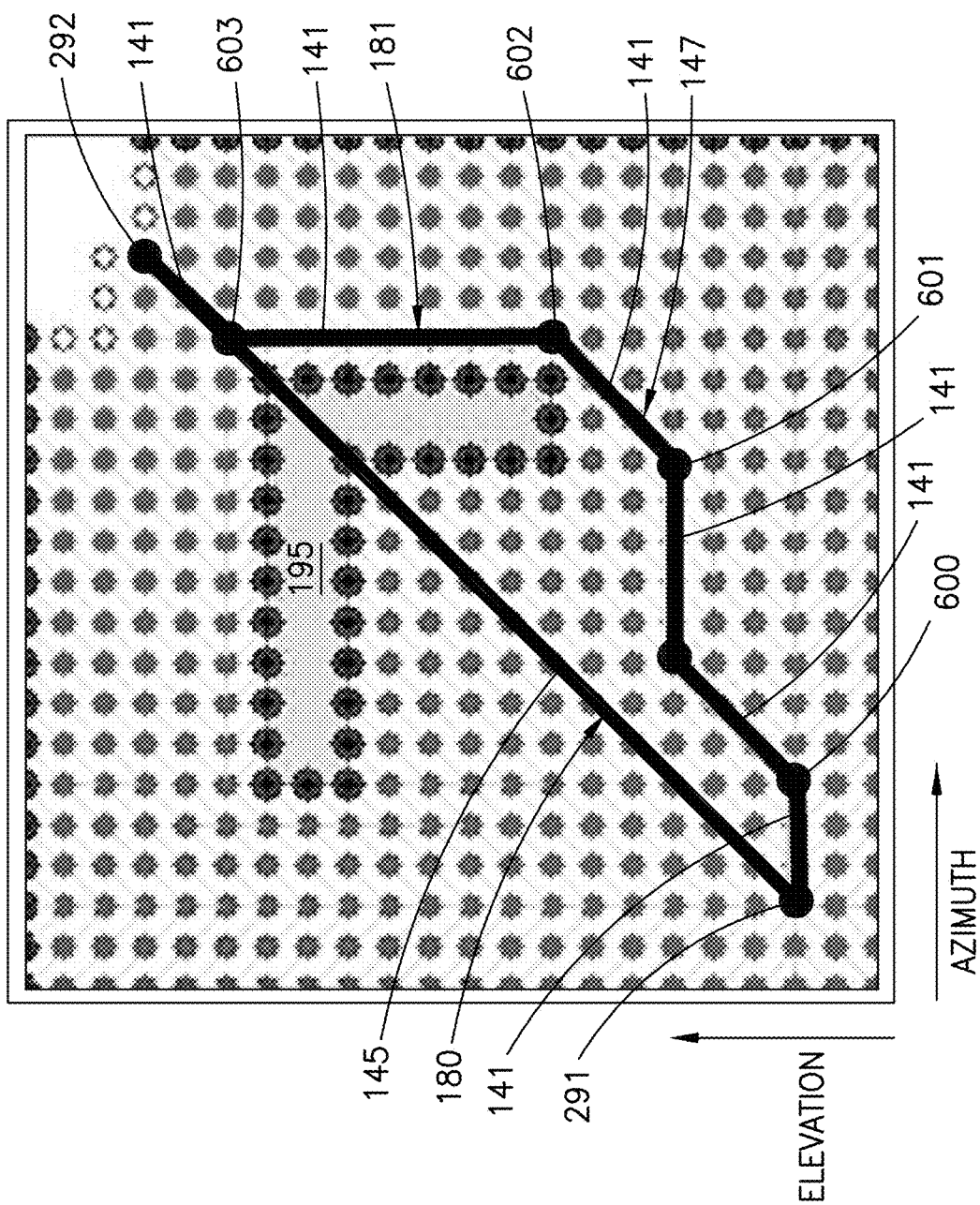
Figure 7:
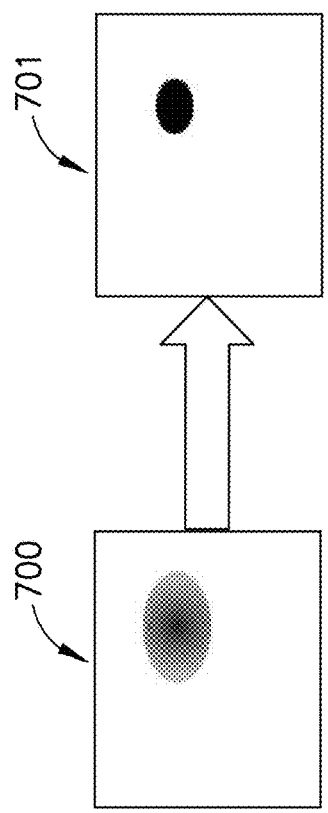
Figure 8:
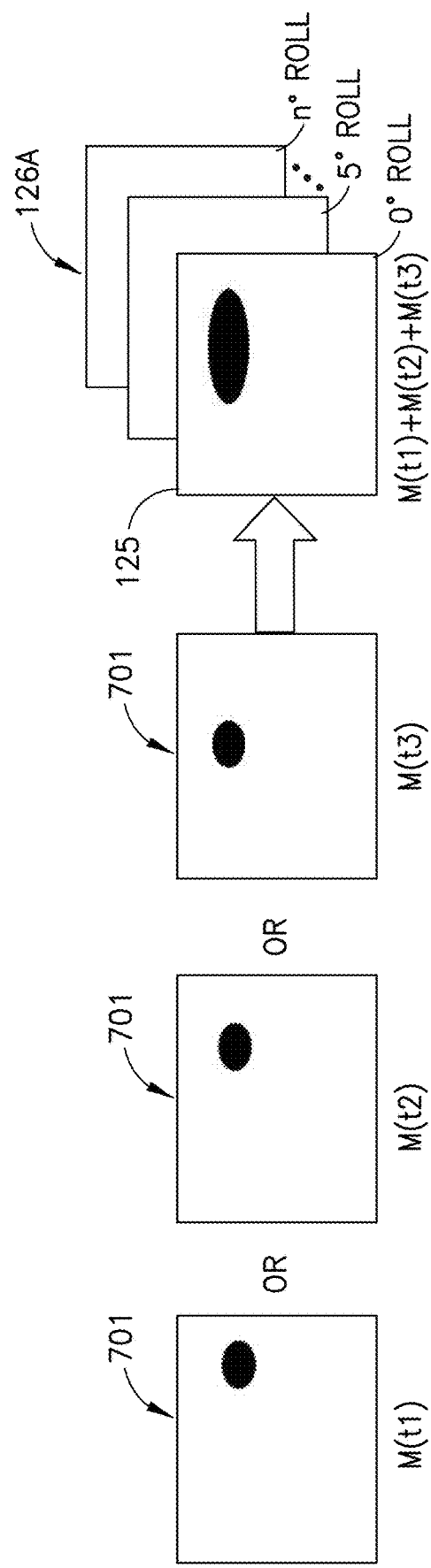
Figure 9:
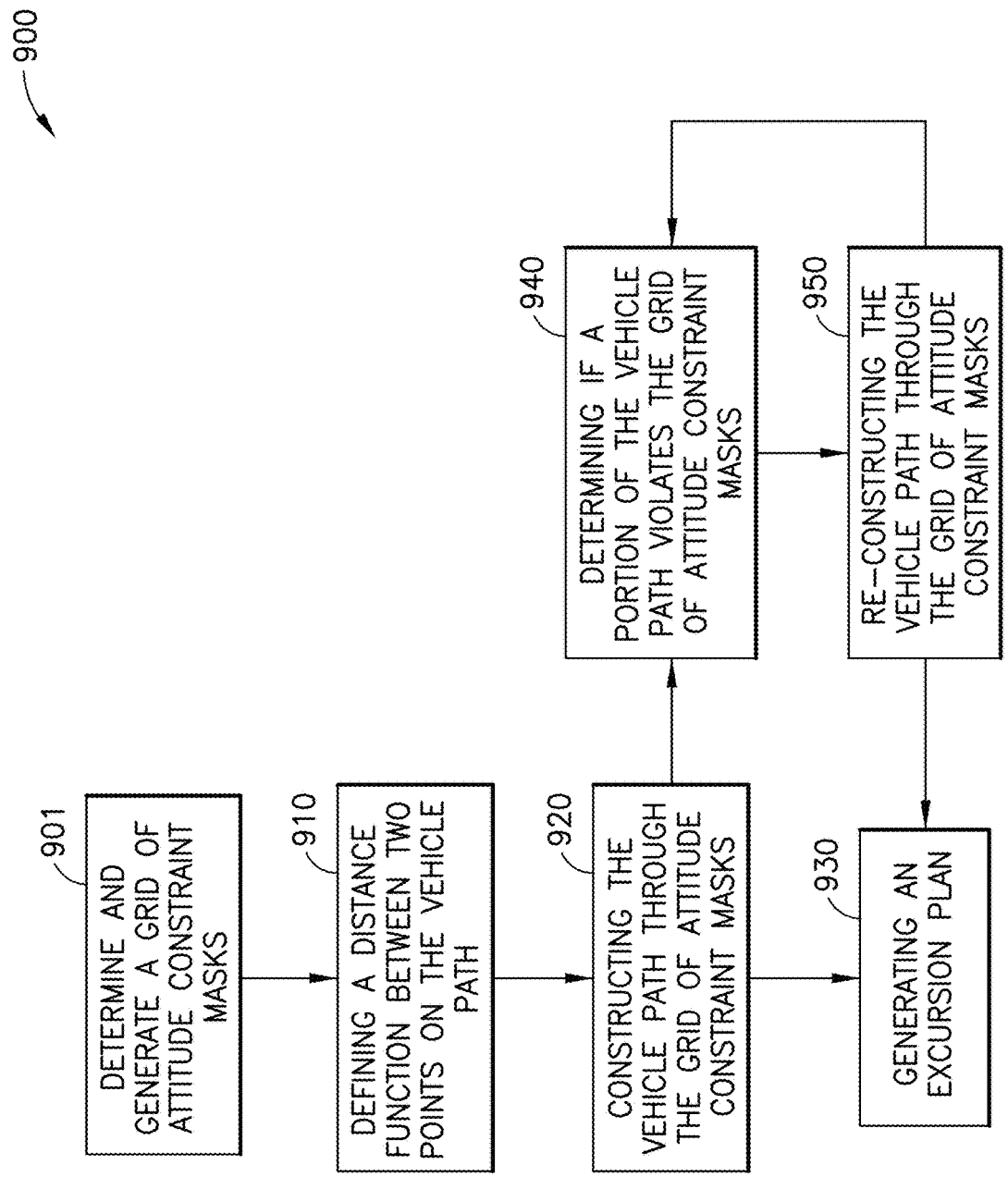
Figure 10:
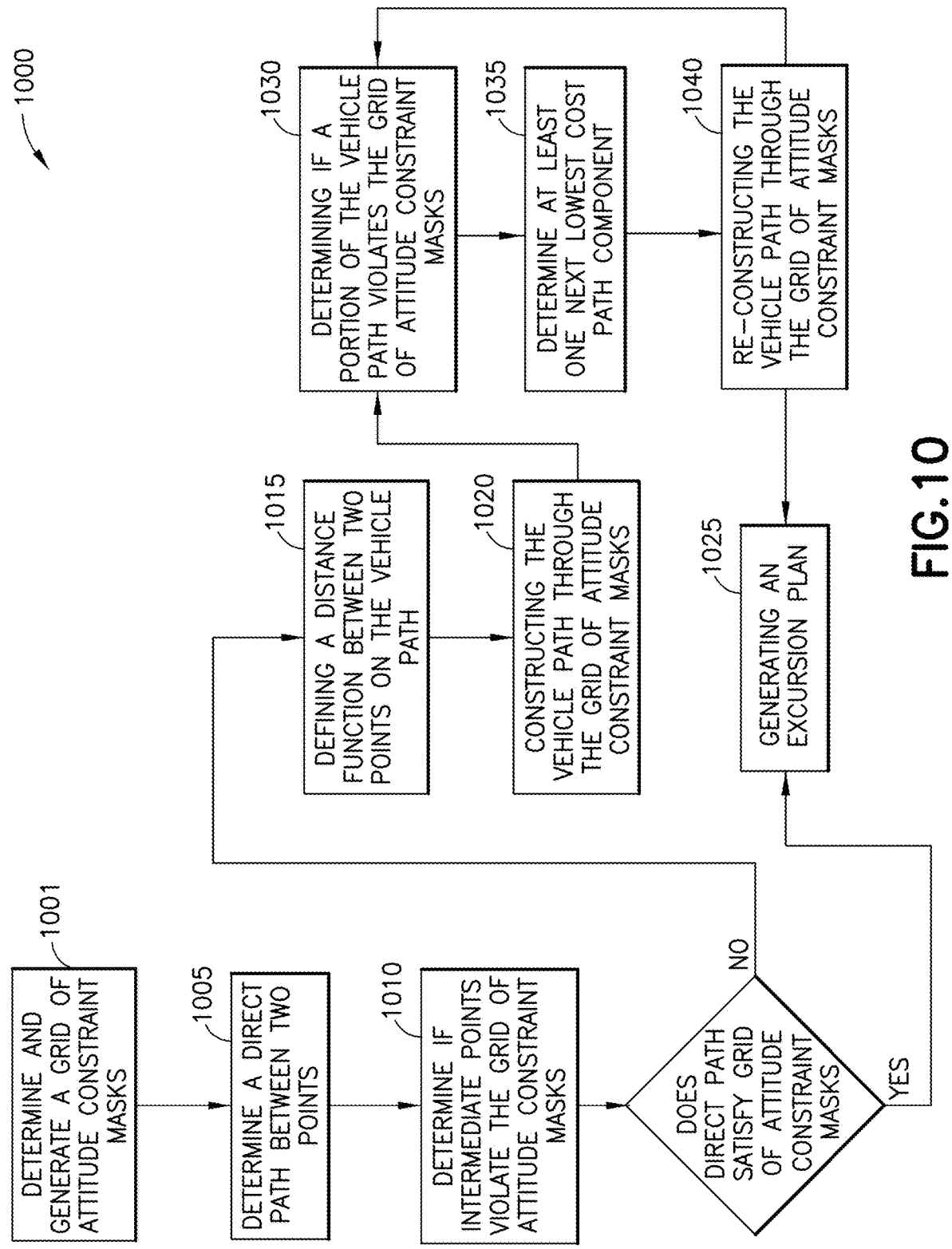

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic block diagram of a system for controlling a vehicle in accordance with aspects of the present disclosure;

FIG. 1B is a schematic block diagram of a portion of the system of FIG. 1A in accordance with aspects of the present disclosure;

FIG. 1C is a schematic block diagram of constraints of the vehicle of FIG. 1A in accordance with aspects of the present disclosure;

FIG. 1D is a schematic block diagram of different types of vehicles corresponding to the vehicle of FIG. 1A in accordance with aspects of the present disclosure;

FIG. 2 is a schematic illustration of the vehicle of FIG. 1A and a schematic representation of the grid of attitude constraints of the vehicle in accordance with aspects of the present disclosure;

FIGS. 3A and 3B are illustrations of exemplary coordinate systems (e.g., operational spaces) in which the vehicle of FIG. 1A operates in accordance with aspects of the present disclosure;

FIG. 4 is another exemplary schematic illustration of the grid of attitude constraints of FIG. 1A in accordance with aspects of the present disclosure;

FIG. 5 is an exemplary illustration of the vehicle coordinate system such as during an evaluation of a vehicle path of the vehicle in accordance with aspects of the present disclosure;

FIG. 6A is exemplary illustration of a determination of a shortest vehicle path in accordance with aspects of the present disclosure;

FIG. 6B is a plan view of a vehicle path in accordance with aspects of the present disclosure;

FIG. 6C is a side view of the vehicle path in FIG. 6B in accordance with aspects of the present disclosure;

FIG. 7 is a schematic illustration of a conversion of an original constraint mask to a binary constraint mask for combining two or more constraint masks in accordance with aspects of the present disclosure;

FIG. 8 is a schematic illustration of a combination of two or more constraint masks in accordance with aspects of the present disclosure;

FIG. 9 is an exemplary flow diagram of a method for generation of a vehicle path component for a vehicle to produce vehicle movements along a vehicle path through at least a three-dimensional space in accordance with aspects of the present disclosure; and FIG. 10 is an exemplary flow diagram of a method for generation of a vehicle path component for a vehicle to produce vehicle movements along a vehicle path through at least a three-dimensional space in accordance with aspects of the present disclosure.

DETAILED DESCRIPTION

Referring to FIGS. 1A and 1B, vehicle 110 excursions often include constraints (e.g., geographic constraints as well as vehicle 110 performance constraints) that the vehicle may not (or preferably does not) exceed. The constraints include, but are not limited to, one or more of attitude constraints of the vehicle 110 (such as those described herein with respect to FIG. 1C), physical obstacles within a predetermined range (e.g., miles/kilometers) of the vehicle 110), terrain constraints (e.g., cliffs and other impasses, altitudes, etc.), or any constraints that may affect vehicle 110 operation and the efficiency thereof. These constraints may result in inefficiencies (e.g., inefficiencies in fuel expenditure, travel time, travel distance, tracking objects, communications, etc.) while the vehicle 110 is conducting the excursion. The aspects of the present disclosure reduce the inefficiencies while substantially abiding by the constraints. The aspects of the present disclosure provide a system 100 for controlling a vehicle and methods 900, 1000 (see FIGS. 9 and 10) that generate a vehicle path 180, i.e., paths that change rotational orientation of the vehicle in roll, pitch, and yaw (and that are distinct from movement of the vehicle 110 along a spatial path in, e.g., an x, y, z coordinate system), through an operational space 190 in situations where vehicle constraints are unknown and/or unpredictable. The operational space 190 is at least a three-dimensional space 191 and in some aspects the operational space is a four dimensional space 192, where the vehicle 110 has six-degrees of freedom for navigating the operational space 190. The aspects of the present disclosure determine a reduced, (e.g., a lowest) cost path depending on the vehicle constraints by converting the operational space 190 to a constraint space (e.g., by employing attitude constraint masks 124), analyzing a vehicle path through the constraint space, and then implementing movement of the vehicle 110 along the vehicle path in the operational space 190 to change the rotational orientation of the vehicle 110.

The lowest cost vehicle path is generally determined through employment of attitude constraint masks 124 that are arranged in a grid of attitude constraint masks 123. Each attitude constraint mask 124 identifies attitude constraints 130 (including at least geographical constraints and vehicle performance constraints) for a respective vehicle attitude, where the attitude of the vehicle is an orientation of the vehicle within the operational space 190. In some aspects, the attitude constraints are continually updated and as a reference frame (e.g., an orientation of a coordinate system of the vehicle 110) is slewed (e.g., turned or rotated) within the operational space such that the attitude constraint masks 124 are time dependent. There may be an attitude constraint mask 124 for each possible attitude of the vehicle 110 within the operational space 190. The vehicle path is determined and then evaluated to determine if the vehicle path violates the attitude constraint masks 124. The aspects of the present disclosure may be executed iteratively throughout a vehicle excursion taking into account, for example, changing vehicle constraints. The aspects of the present disclosure may be performed in real time, where real time real time may be milliseconds, seconds, minutes, or any other suitable interval that provides continual updating of attitude constraints and continual vehicle path evaluation.

Referring to FIGS. 1A, 1B and 1D, the aspects of the present disclosure provide for a system 100 for controlling a vehicle 110 for movement along a vehicle path 180 through at least the three-dimensional space 191. The system includes the vehicle 110 and an excursion planning processor 120 communicably coupled to the vehicle 110. The vehicle 110 may be any suitable vehicle such as an aircraft 114, a maritime vessel 115, a submersible 116, a spacecraft 117, and/or a land vehicle 118. The vehicle 110 may be an autonomous vehicle 111, a manned vehicle 112, or a remotely controlled vehicle 113 (manually remotely controlled and/or autonomously remotely controlled). In aspects where the vehicle is a manned vehicle 112 or a manually remotely controlled vehicle the aspects of the present disclosure may be used as guidance for manual navigation of the vehicle 110 and the vehicle path 180 (or reconstructed vehicle path 181 as will be described herein) are presented on a user interface 119 of the vehicle 110 for vehicle operator review and implementation. The vehicle 110 includes a vehicle control computer 140 or other vehicle system that effects autonomous or manual (depending on the type of vehicle noted above) navigation of the vehicle 110 through the operational space 190. The vehicle includes one or more environmental sensors 150 for sensing various vehicle and environmental data. The environmental sensors 150 may include accelerometers, heat sensors, optical sensors, acoustic sensors or any other sensors configured to determine an attitude of the vehicle, object locations relative to the vehicle, terrain mapping, visual impairment or any other data that may affect vehicle 110 operation. The vehicle 110 also includes a communication system 170 configured to wirelessly transfer data between the vehicle 110 and remotely located facilities (e.g., such as ground bases, other vehicles, etc.).

In one aspect, the excursion planning processor 120 may be disposed onboard the vehicle 110 so as to be integrated into the vehicle 110 and coupled (either through physical wires or wirelessly) to the vehicle control computer 140 where data signals are passed between the vehicle control computer 140 and the excursion planning processor 120 to effect navigation of the vehicle 110. The excursion planning processor 120 may also be communicably coupled (either through physical wires or wirelessly) to the environmental sensor 150 so that the excursion planning processor 120 receives environmental sensor data 151 from the environmental sensors 150. In another aspect, the excursion planning processor 120 may be disposed off-board the vehicle 110, such as located on the ground so as to be in wireless communication with the vehicle 110. For example, where the excursion planning processor 120 is off-board the vehicle 110, the excursion planning processor 120 includes (or is coupled to) a communication system 199 that is configured to wirelessly communicate with the communication system 170 of the vehicle 110 so as transmit data signals between the vehicle control computer 140 and the excursion planning processor 120. In still other aspects, portions of the excursion planning processor 120 may be disposed onboard the vehicle 110 while other portions may be disposed off-board the vehicle 110 (e.g., where some aspects of the present disclosure are processed onboard the vehicle 110 and other aspects are processed off-board the vehicle 110 as described herein).

Referring to FIGS. 1A, 1B and 1C, the vehicle 110 operates within the operational space 190 under certain attitude constraints 130. The attitude constraints 130 may be any suitable constraints that affect vehicle navigation and/or a vehicle mission (e.g., any suitable objective the vehicle 110 is set out to accomplish). The attitude constraints 130 include, but are not limited to, visual impairment constraint(s) 131 (e.g., such as visual/sensor blinding by the sun or other luminous object, clouds, fog, smoke, etc.), vehicle kinematic constraint(s) 132 (e.g., acceleration, jerk of the vehicle motion, force loading on the vehicle frame, velocity, etc.), maneuverability constraint(s) 133 (e.g., minimum turn radius, deceleration rates, acceleration rates, stall angle, list angle, roll rate, etc.), altitude constraint(s) 134 (e.g., maximum altitude such as for an aircraft or automobile), depth constraint(s) 135 (e.g., maximum dive depth such as for a submersible), object tracking constraint(s) 136, pressurization constraints 137 (e.g., such as for aircraft, submersibles and aerospace vehicles), power constraint(s) 138 (e.g., vehicle thrust capabilities), and communication constraint(s) 139 (e.g., antenna pointing/targeting constraints). Other examples of attitude constraints include, but are not limited to, angle of attack, limitations on a glide path, and maximizing solar collection. The environmental sensors 150 are configured to detect/sense environmental data related to one or more of these attitude constraints 130 and generate corresponding environmental sensor data 151 that is employed by the excursion planning processor 120 to optimize at least the vehicle path 180.

Referring to FIGS. 1A, 1B and 6, the excursion planning processor 120 is configured to (e.g., is programmed to) determine and generate a grid of attitude constraint masks 123 by defining any suitable distance function 128 between two points 290 on the vehicle path 180 and determine a vehicle path component 141, of the vehicle path 180 between the two points 290, having a selected cost. In one aspect, the vehicle path component 141 is a constrained cost-optimized vehicle path component having a lowest cost.

Referring to FIGS. 1A and 1B the excursion planning processor 120 is configured to (e.g., is programmed to) determine and generate a grid of attitude constraint masks 123 corresponding to at least the three-dimensional space 191, where each attitude constraint mask 124 corresponds to a respective possible attitude of the vehicle 110. The excursion planning processor 120 is configured to determine the grid of attitude constraint masks 123 from the environmental sensors 150 disposed onboard the vehicle 110 such that when determining the vehicle path 180 the constraints determined from the environmental sensors 150 are included in the a grid of attitude constraint masks 123. For example, referring to FIG. 2, an exemplary grid of attitude constraint masks 123 is illustrated where each attitude constraint mask 124A-124n in the grid of attitude constraint masks 123 maps roll-pitch of the vehicle 110 and corresponds to a respective degree of vehicle yaw, where there is a possible 360 degree yaw at each vehicle location. Each attitude constraint mask is a two-dimensional representation of the operational space 190 and represents two axes of the vehicle, which in the example of FIG. 2 are roll and pitch. A separate map layer (e.g., an attitude constraint mask 124A-124n) is created for each yaw value (which may be consecutive values or stepped/interval values) to generate the grid of attitude constraint masks 123.

The grid of attitude constraint masks 123 in FIG. 2 is generated using roll-pitch-yaw (e.g., Euler angles) but may be generated in any suitable reference frame. For example, referring to FIGS. 2, 3A, 3B, and 4, the vehicle 110 of FIG. 2 can point a front 110F of the vehicle 110 on a sphere 320 around a pivot axis 110X of the vehicle by pitching the vehicle 110 up and down (e.g., rotation about the Y axis), and yawing left and right (e.g., rotation about the Z axis). FIG. 3A represents the pointing of the vehicle 110 on the sphere 320 as a Euler angle representation (e.g., roll-pitch-yaw), while FIG. 3B represents the pointing of the vehicle 110 on the sphere 320 as a quaternions representation. However, while quaternions do not map directly to roll, pitch and yaw: their vector u represent the axis of rotation and their vector length the amount of rotation (see FIG. 3B). Considering a rotation in FIGS. 3A and 3B starting at point 300 of a $\vec{y}$ yaw (see arrow 301) about the z-axis and extending from the x-axis to y-axis; where the yaw is followed by a pitch $\vec{p}$ (see arrow 302) from the y-axis to the z-axis. This yawing and pitching motion of the vehicle 110 is represented by a growth in the quaternion $\bar{q}_y$ along the z-axis (with the roll being about 90°) followed by the pitch $\bar{q}_p$ around the x-axis as a movement of the vector $\bar{q}_y$ around the x-axis vector by length $\bar{q}_p$. In either the Euler angle representation or the quaternion representation, the 2D surface of the sphere 320 only represents two dimensions: pitch and roll in the Euler angle representation or the quaternion unit vector $\bar{u}$ in the quaternion representation. To represent a third dimension, the yaw in the Euler representation or the length of $\vec{q}$ in the quaternion representation is added as different map layers representing the radius of the sphere 320. A fourth dimension (e.g., time) may also be added for a given spatial path, and may change with any spatial path changes.

Referring to FIG. 4 the grid of attitude constraint masks 123 is generated by mapping a hard-to-visualize four-dimension quaternion to a three-dimension grid that can be navigated using any suitable shortest-path algorithm as described herein. With reference to the quaternion representation (a similar derivation of the grid of attitude constraint masks 123 may be performed with respect to the Euler representation) and using only unit quaternions (|q|=1) rotations $$q = w + xi + yj + zk = [w,x,y,z] = \cos\theta + \vec{v}\sin\theta \qquad \text{(eq. 1)}$$

is a rotation 2θ about the unit vector $\vec{v}$. The total set of possible orientations are where w≥0. Given that w=(q−$\vec{v}$ sin θ)/cos θ can be determined from the 3D ball of points $\bar{u}=\vec{v}$ sin θ alone, creating a grid "mask" of $\bar{u}$ is sufficient. Also, since each vector $\bar{u}$ has a radius sin θ from the center of the sphere 320, the two-dimensional surface of v can be gridded and is repeated at each radii representing the grid in θ. Thus, an equal area or distant grid for the surface, and then an equal distant step in $$-\frac{\pi}{2} < \theta < \frac{\pi}{2}$$

represents a three-dimensional space for all the orientations of the vehicle 110. The distance between grid points should be about the same such that $\Delta\theta = a\cos(q_a \cdot q_b)$. As an example, if one surface of one $\theta$ (e.g., rotation of the vehicle 110 such as in yaw), the mask could have a simple binary or continuous value of good (lighter grey) to bad (darker gray) (see FIG. 2) and then be used in a cost function to find the best path through the mask.

Eq. 1 can be represented by $q = [\theta, \vec{v}]$, a unit vector $\vec{v}$ and unitary rotation $\theta$, and since $|\vec{v}| = 1$ and $\vec{v}$ is simply the surface of a sphere after yawing $\psi$ and pitching $\phi$, $$q = [\psi, \phi, \theta] \quad (\text{eq. 2})$$

But these Euler angles [$\psi$, $\phi$] get translated into a unit quaternion as (assuming yaw then pitch):

$$q = \left[\cos\frac{\phi}{2}\cos\frac{\psi}{2}, -\sin\frac{\phi}{2}\sin\frac{\psi}{2}, \sin\frac{\phi}{2}\cos\frac{\psi}{2}, \cos\frac{\phi}{2}\sin\frac{\psi}{2}\right] \quad (\text{eq. 3})$$

where the elevation (or latitude with respect to a world map)

$$e = a\sin z = a\sin\left(\cos\frac{\phi}{2}\sin\frac{\psi}{2}\right);$$

and azimuth (or longitude with respect to a world map)

$$a\tan\frac{y}{x} = -a\tan\left(\frac{\cos\frac{\psi}{2}}{\sin\frac{\psi}{2}}\right).$$

This 3D representation consists of a 2D sphere (representing the axis of rotation with the azimuth and elevation, $\psi \in [0, 2\pi]$ and $$\phi \in \left[-\frac{\pi}{2}, \frac{\pi}{2}\right],$$

or elevation/latitude e and azimuth/longitude a similar to world map, and a $\theta$ rotation about that axis. Thus, the world map can be stacked with various rotations $\theta \in [0, 2\pi]$ as illustrated in FIG. 4. These stacked map layers (i.e., stacked attitude constraint masks 124A-124n) can then be navigated like a normal three-dimensional grid. The layers do not have to be rectilinear as illustrated in FIG. 4, and may be more complex such as in the form of a Hierarchical Equal Area isoLatitude Pixelization of a sphere (also known as a HEAL-Pix) which is a two-dimensional map providing an equal area scalable mapping to increase resolution. Each HEAL-Pix attitude constraint mask 124 also has an algorithm to move from one location on a map layer to its nearest neighbors on adjacent map layers if needed for the shortest-path algorithms in a manner similar to a rectilinear grid where point p(x,y)=(2,3) (point 2, 3 is used as an example) has a left neighboring point left(p)=(1,3), a right neighboring point right(p)=(3,3), a rearward neighboring point rearward (p)=(2,2), and forward neighboring point forward(p)=(2,4).

In one aspect, the grid of attitude constraint masks 123 is stored in the memory 122 of the excursion planning processor 120 as a look up table 127 so as to reduce processing power such as where the vehicle 110 has limited processing capabilities.

Referring to FIGS. 1A, 1B and 6, in one aspect, the excursion planning processor 120 is configured to define the distance function 128 between the two points 290 on the vehicle path 180 to include a cost for changing a travel direction 129 of the vehicle 110. The two points 290 include a first point 291 (e.g., a beginning/starting point) and a second point 292 (e.g., an ending/finishing point) of the vehicle path 180 that may be dynamically updated each time the masks and paths are updated as the vehicle 110 moves through the operational space 190. There may be any suitable number of intermediate points 600-603 along the vehicle path 180 between the first point 291 and the second point 292.

The excursion planning processor 120 is configured to determine vehicle path component 141 (which may be a constrained cost-optimized component), of the vehicle path 180, between the two points 290 having a selected cost (e.g., such as a lowest cost) by determining a shortest path 145 satisfying the grid of attitude constraint masks 123. The excursion planning processor 120 is configured to determine the shortest path 145 by employing one or more of Dijkstra's algorithm 161, Bellman-Ford algorithm 162, A* search algorithm 163, Floyd-Warshall algorithm 164, Johnson's algorithm 165, and Viterbi algorithm 166 or any other suitable algorithm. In one aspect, the excursion planning processor 120 is configured to determine the vehicle path component 141, of the vehicle path 180, between the two points 290 having the lowest cost by determining a travel path around one or more obstacles 195 where the travel path around the one or more obstacles 195 satisfies the grid of attitude constraint masks 123.

The excursion planning processor 120 is configured to construct the vehicle path 180 through the grid of attitude constraint masks 123 from the vehicle path component 141. Where the excursion planning processor 120 is disposed onboard the vehicle 110, the vehicle path 180 is determined by the excursion planning processor 120 onboard the vehicle 110. In another aspect, the excursion planning processor 120 comprises an off-board processor 121 and the vehicle 110 comprises the communication system 170 configured to transmit environmental sensor data 151 from the vehicle 110 to the off-board processor 121, where the off-board processor 121 is configured to determine the grid of attitude constraint masks 123 from the environmental sensor data 151. The off-board processor 121 is configured to transmit one or more attitude constraint masks 124 of the grid of attitude constraint masks 123 to the vehicle 110. In one aspect, the excursion planning processor 120, when located off-bard the vehicle 110 is configured to determine the vehicle path 180 off-board the vehicle 110 and transmit one or more of the vehicle path 180 or a reconstructed vehicle path 181 as described herein to the vehicle 110. In one aspect, the excursion planning processor 120 is configured to determine the vehicle path 180 onboard or off-board the vehicle 110 in real time or at any suitable time prior to or during the vehicle excursion. The excursion planning processor 120 is configured to generate an excursion plan 148 so that the vehicle 110 travels (i.e., is directed to and executes travel) along the vehicle path 180.

In one aspect, the excursion planning processor 120 is configured to determine if a portion 280 of the vehicle path 180 violates the grid of attitude constraint masks 123. For example, the excursion planning processor 120 is configured to determine if the shortest path 145 violates the grid of attitude constraint masks 123. The excursion planning processor 120 may be programmed to perform a spherical liner interpolation (SLERP) which finds the intermediate points along a great circle path 299 (FIG. 2) between the first point 291 and the second point 292, where the great circle path is a circle on the surface of a sphere which lies in a plane passing through the sphere's center. The great circle path represents the shortest distance between any two points on a sphere. Using SLERP, moving from the first point 291 in steps similar to the grid size $\Delta\theta$, each grid point along the shortest path 145 (which may be direct (e.g., straight line) path 189—FIG. 2) can be evaluated and any blockage can be determined. If there is no blockage, the shortest path 145 is valid and is used to generate an excursion plan 148 as described herein. For example, $$\text{Slerp}(A,B,t) = q_A^{1-t} q_B^t \quad (\text{eq. 4})$$

where $$q^t = w \cos t\theta + \vec{v} \sin t\theta \quad (\text{eq. 5})$$

and q is defined as in eq. 1.

In greater detail with respect to FIG. 5 the shortest path 145 may be evaluated per the Euler rotation theorem where there is a direct path between two orientations a, b around a rotation vector $\bar{u}$ by angle $\theta$; where orientation a is represented as the black X, Y, Z reference frame and orientation b is represented as the lighter gray X,Y,X reference frame. In quaternion notation, moving from $q_a \rightarrow q_b$ is simply the quaternion $$q_{b/a} = \left[\cos\frac{\theta}{2}, \sin\frac{\theta}{2} u\right] = \frac{q_b}{q_a} = \frac{q_a^* q_b}{|q_a|^2}.$$

A path along this unit quaternion can be interpolated with SLERP as $q_{a \rightarrow b}(t) = q_a q_{b/a}^t =$ $$q_a^{1-t} q_b^t = \left[\cos\frac{(1-C)\theta_a}{2}, \sin\frac{(1-C)\theta_a}{2} u_a\right]\left[\cos\frac{t\theta_b}{2}, \sin\frac{t\theta_b}{2} u_b\right],$$

a simple algorithm to find the intermediate quaternions between the two endpoints $t \in [0,1]$ since $$q^t = \left[\cos\frac{t\theta}{2}, \sin\frac{t\theta}{2}\bar{u}\right].$$

FIG. 6A and FIGS. 6B and 6C illustrate cases where the shortest path 145 violates the grid of attitude constraint masks 123 (e.g., one or more obstacles 195 obstruct the shortest path 145). Referring again FIGS. 1A and 1B upon a determination that the portion 280 of the vehicle path 180 violates the grid of attitude constraint masks 123, the excursion planning processor 120 is configured to determine at least one next lowest cost path component 147 between the two points 290. To determine the next lowest cost path component 147, the excursion planning processor 120 is configured to define an alternative cost function 142, when the vehicle path 180 violates the grid of attitude constraint masks 123, and employs any suitable least cost algorithm(s), such as Dijkstra's algorithm (and/or the other algorithms described herein). In one aspect, the alternative cost function 142 the alternative cost function 142 includes one or more of a shortest duration of violation 143 in which the vehicle path 180 violates an attitude constraint 130 and a shortest total transit time 144. In one aspect, the alternative cost function 142 includes a distance between two points (such as between adjacent intermediate points or between the end points) and a cost for changing directions a direction of the vehicle 110 away from the great circle path.

For example, referring to FIGS. 6A-6C, the at least one next lowest cost path component 147 includes the vehicle path components 141 where the intermediate points 600-603 may represent waypoints along the vehicle path 180. It is noted, with respect to FIGS. 6B and 6C that the lowest cost or next lowest cost path component 147 may be a shortest path (e.g., the shortest distance between two end points or two intermediate points), while in other aspects the lowest cost or next lowest cost path component 147 may ignore the path length and be a path that extends a long way around an obstacle (e.g., going around a mountain may be the better route rather than climb above/over the mountain such as where the vehicle 110 is constrained from travelling above/over the mountain).

The excursion planning processor 120 is configured to re-construct the vehicle path 180, based on the alternative cost function 142, through the grid of attitude constraint masks 123 with the at least one next lowest cost path component 147. The excursion planning processor 120 is configured to determine if a portion 280A of the reconstructed vehicle path 181 violates the grid of attitude constraint masks 123. If one or more portions 280A of the reconstructed vehicle path 181 violates the grid of attitude constraint masks 123 the excursion planning processor is configured to repeat the reconstructed vehicle path determination in an iterative loop by determining other alternative cost functions and next lowest cost path components 147 until a reconstructed vehicle path (see the different reconstructed vehicle paths 181A-180n in FIG. 1B) is generated that does not violate the grid of attitude constraint masks 123. The excursion planning processor 120 is configured to generate the excursion plan 148 so that the vehicle 110 travels (i.e., is directed to and executes travel) along the reconstructed vehicle path 181 that does not violate the grid of attitude constraint masks 123.

The excursion planning processor 120 is configured to construct the vehicle path 180 or the reconstructed vehicle path 181 by smoothing the vehicle path 180 so as to generate a substantially continuous slewing of the vehicle 110 between the two points 290. The vehicle excursion planning processor 120 is configured with one or more of, for example, the spherical linear interpolation (SLERP) and spherical quadratic interpolation (SQUAD) which are employed to smooth the vehicle path components 141/next lowest cost path component(s) 147, in a manner substantially similar to smoothing with a Bezier curve, Hermite spline, B-spline or higher order splines (e.g., corresponding to third order derivatives or higher); where the vehicle path components 141/next lowest cost path component(s) 147 are smoothed into a connection of turns between the first point 291 and the second point 292. The vehicle path 180 or the reconstructed vehicle path 181 is constructed through the grid of attitude constraint masks 123 using, e.g., SQUAD to join together several great-circle segments (where two or more adjacent vehicle path components 141/next lowest cost path component(s) 147 are great circle paths between the respective intermediate points), which provides for a continuous movement from the first point 291 to the second point 292 without interruption as well as control over the velocity, acceleration and jerk of the slew.

Here, SQUAD is a recursive use of SLERP where:

$$\text{Squad}(A,C,B,t) = \text{Slerp}(\text{Slerp}(A,C,t), \text{Slerp}(C,B,t),t) = q_A^{(1-t)^2} q_C^{2(1-t)t} q_B^{t^2}$$ (eq. 4)

The smoothed vehicle path 180 or the reconstructed vehicle path 181 created by SQUAD can be evaluated, in a manner similar to that described above, along steps (e.g., intervals along the path) similar to the grid size (e.g., the interval between the map levels as described above) to determine if any of the proposed smoothed path violates the grid of attitude constraint masks 123. For example, the SLERP or SQUAD interpolations can be evaluated to step along the smoothed vehicle path 180 or the reconstructed vehicle path 181 (in some fractional step size of $t \in [0,1]$ like $t=0.1$) and evaluate the distance to each mask location. If the distance to any mask location is too close or crosses an attitude constraint mask 124, another vehicle path can be chosen (e.g., an equal distance or longer path) and evaluated as described herein to determine if the other vehicle path violates the grid of attitude constraint masks 123.

In the aspects of the present disclosure, referring to FIGS. 1B, 7 and 8, where an attitude constraint 130 changes over time, the excursion planning processor 120 is configured to generate a cumulative mask 125 within the grid of attitude constraint masks 123 by combining attitude constraint masks 124 of a same type (e.g., same type meaning masks having visual impairment constraints are combined, masks having kinematic constraints (e.g., velocity, acceleration, jerk) are combined, etc.) over a predetermined time period. The excursion planning processor 120 is configured to combine the attitude constraint masks 124 by converting each mask from a value constraint mask 700 (which may be a color RGB mask, a grayscale mask, etc.) to a binary constraint mask 701, where the masks are not already in a binary format, so as to reduce processing power necessary to combine the masks. In other aspects, the value constraint masks 700 may be combined in any suitable manner such as with any suitable thresholding. The binary constraint masks 701 for different points in time (as shown in FIG. 8) are combined using, e.g., a logical OR operation to generate a cumulative mask 125. In other aspects, the binary constraint masks 701 may be combined in any suitable manner. In this example, the darker portions of the binary cumulative mask are to be avoided and comprise a constraint when determining the vehicle path 180 and/or the reconstructed vehicle path 181.

Where a slew of the vehicle 110 persists over a predetermined period of time, the excursion planning processor 120 is configured to generate sets of cumulative masks 126 within the grid of attitude constraint masks 123 by combining, with the excursion planning processor 120, the attitude constraint masks 124 of the same type over the predetermined time period. The excursion planning processor 120 is configured to construct a respective vehicle path 167 (which is substantially similar to the vehicle path 180 and/or reconstructed vehicle path 181) for each set 126A in the sets of cumulative masks 126, in the manner described above, in one or more of a forward direction 600 from a beginning of the predetermined time period and in a reverse direction 601 from an end of the predetermined time period. Generation of the respective vehicle path 167 in the forward direction 600 and reverse direction 601 may provide an additional path validation against the attitude constraints 130. The excursion planning processor 120 is configured to construct the vehicle path 180 from one or more of the respective vehicle paths 167 in the manner described above. The respective vehicle paths 167 of different sets of cumulative masks 126 are connected to each other at any path location that satisfies attitude constraints 130 of the respective set of cumulative masks 126.

Referring now to FIGS. 1A, 1B and 9 an exemplary method 900 will be described. The method is for generation of at least one vehicle path component 141 for a vehicle 110 where the vehicle path component 141 is disposed along a vehicle path 180 through at least a three-dimensional space 191 and the vehicle movements follow the vehicle path component 141. The method 900 includes determining and generating, with an excursion planning processor 120, a grid of attitude constraint masks 123 (FIG. 9, Block 901) corresponding to the at least the three-dimensional space 191 in the manner described above, where each attitude constraint mask 124 corresponding to a respective possible attitude of the vehicle 110. A distance function 128 is defined, with the with the excursion planning processor 120, between two points 290 on the vehicle path 180 (FIG. 9, Block 910), such that the vehicle path 180 defines a change in orientation of the vehicle 110. The vehicle path component 141, of the vehicle path 180, between the two points 290 having a selected cost (e.g., in one aspect a lowest cost) is determined as described above. The vehicle path 180 through the grid of attitude constraint masks 123 is constructed (FIG. 9, Block 920), with the excursion planning processor 120 as described above, from the vehicle path component 141, and the excursion plan 148 is generated (FIG. 9, Block 930), with the excursion planning processor 120 as described above, so that the vehicle 110 travels along the vehicle path 180.

In one aspect, the method 900 includes determining if a portion 280 of the vehicle path 180 violates the grid of attitude constraint masks 123 (FIG. 9, Block 940) as described above. Where the portion 280 of the vehicle path 180 violates the grid of attitude constraint masks 123 the method 900 includes re-constructing the vehicle path 180 through the grid of attitude constraint masks 123 (FIG. 9, Block 950) as described above by determining, with the excursion planning processor 120, at least one next lowest cost path component 147 between the two points 290, and re-constructing, with the excursion planning processor 120, the vehicle path 180 through the grid of attitude constraint masks 123 with the at least one next lowest cost path component 147 and determine if a portion 280A of the reconstructed vehicle path 181 violates the grid of attitude constraint masks 123. The method 900 includes generating, with the excursion planning processor 120, the excursion plan 148 (FIG. 9, Block 930) so that the vehicle 110 travels along the reconstructed vehicle path 181.

Referring to FIGS. 1A, 1B, and 10 an exemplary method 1000, for generation of a vehicle path component 141 (which in one aspect is a constrained cost-optimized path component) for a vehicle 110 will be described. The method 1000 includes determining and generating, with an excursion planning processor 120, a grid of attitude constraint masks 123 (FIG. 10, Block 1001) corresponding to at least the three-dimensional space 191, wherein each attitude constraint mask 124 corresponds to a respective possible attitude of the vehicle 110, in the manner described herein. The method includes determining, with the excursion planning processor 120, a direct path 189 between two points 290 (FIG. 10, Block 1005) and determining if intermediate points 298 along a great circle path 299 between the two points 290 violates the grid of attitude constraint masks 123 (FIG. 10, Block 1010), in the manner described herein. Where the direct path 189 satisfies the grid of attitude constraint masks 123 the method includes generating, with the excursion planning processor 120, an excursion plan 148 (FIG. 10, Block 1025) so that the vehicle 110 travels along the direct path 189, in the manner described herein.

Where the direct path 189 violates the grid of attitude constraint masks 123, the method further includes defining, with the excursion planning processor 120, a distance function 128 between two points 290 on the vehicle path 180 (FIG. 10, Block 1015) to include a cost for changing a travel direction 129 of the vehicle 110 and determining the vehicle path component 141, of the vehicle path 180, between the two points 290 having a lowest cost, in the manner described herein. The vehicle path 180 is constructed/selected, with the excursion planning processor 120 in the manner described herein, through the grid of attitude constraint masks 123 (FIG. 10, Block 1020) from the vehicle path component 141 and it is determined if a portion 280 of the vehicle path 180 violates the grid of attitude constraint masks 123 (FIG. 10, Block 1030). Where the portion 280 of the vehicle path 180 violates the grid of attitude constraint masks 123 the method includes determining, with the excursion planning processor 120 in the manner described herein, at least one next lowest cost path component 147 (FIG. 10, Block 1035) between the two points 290, and re-constructing, with the excursion planning processor 120, the vehicle path 180 through the grid of attitude constraint masks 123 with the at least one next lowest cost path component 147 (FIG. 10, Block 1040). The method includes generating, with the excursion planning processor 120 in the manner described herein, the excursion plan 148 (FIG. 10, Block 1025) so that the vehicle 110 travels along the reconstructed vehicle path 181. The method may also include determining, with the excursion planning processor 120, if a portion 280A of the reconstructed vehicle path 181 violates the grid of attitude constraint masks 123 (FIG. 10, Block 1040) in the manner described herein.

The following are provided in accordance with the aspects of the present disclosure:

A1. A method 900 for generation of a vehicle path for a vehicle 110, the method 900 comprising:
using an excursion planning processor 120 to perform the steps of:
generating a grid of attitude constraint masks 132, wherein each attitude constraint mask 124 corresponds to a respective possible attitude of the vehicle 110;
defining a distance function 128 between two points 290 on a vehicle path 180, such that the vehicle path 180 defines a change in orientation of the vehicle 110;
determining a vehicle path component 141, of the vehicle path 180, between the two points 290 having a selected cost;
selecting a vehicle path in the grid of attitude constraint masks 123 from the vehicle path component 141; and
generating an excursion plan 148 so that the vehicle 110 travels along the vehicle path 180.

A2. The method 900 of paragraph A1, wherein the distance function 128 between the two points 290 on the vehicle path 180 is defined to include a cost for changing a travel direction 129 of the vehicle 110.

A3. The method 900 of paragraph A1, further comprising:
determining if a portion 280 of the vehicle path 180 violates the grid of attitude constraint masks 123, and where the portion 280 of the vehicle path 180 violates the grid of attitude constraint masks 123, using the excursion planning processor (120) to perform the steps of:
determining, with the excursion planning processor 120, at least one next lowest cost path component 147 between the two points 290, and re-constructing, with the excursion planning processor 120, the vehicle path 180 through the grid of attitude constraint masks 123 with the at least one next lowest cost path component 147 and determine if a portion 280A of the reconstructed vehicle path 181 violates the grid of attitude constraint masks 123; and
generating, with the excursion planning processor 120, the excursion plan 148 so that the vehicle 110 travels along the reconstructed vehicle path 181.

A4. The method 900 of paragraph A3, further comprising:
defining an alternative cost function 142 with the excursion planning processor 120 when the vehicle path 180 violates the grid of attitude constraint masks 123; and
determining the reconstructed vehicle path 181 based on the alternative cost function 142.

A5. The method 900 of paragraph A4, wherein the alternative cost function 142 includes one or more of a shortest duration of violation 143 in which the vehicle path 180 violates an attitude constraint 130 and a shortest total transit time 144.

A6. The method 900 of paragraph A1, wherein the vehicle path 180 is determined by the excursion planning processor 120 onboard the vehicle 110.

A7. The method 900 of paragraph A6, wherein the vehicle path 180 is determined onboard the vehicle 110 in real time.

A8. The method 900 of paragraph A6, further comprising determining the grid of attitude constraint masks 123 from environmental sensors 150 disposed onboard the vehicle 110.

A9. The method 900 of paragraph A6, wherein determining the grid of attitude constraint masks 123 includes transmitting environmental sensor data 151 from the vehicle 110 to an off-board processor 121 configured to determine the grid of attitude constraint masks 123 from the environmental sensor data 151, and the method further includes transmitting one or more attitude constraint masks 124 of the grid of attitude constraint masks 123 to the vehicle 110.

A10. The method 900 of paragraph A6, wherein the grid of attitude constraint masks 123 is stored in a memory 122 of the excursion planning processor 120 as a look up table 127.

A11. The method 900 of paragraph A1, wherein the vehicle path 180 is determined by the excursion planning processor 120 off-board the vehicle 110 and the method further comprises transmitting one or more of the vehicle path 180 or a reconstructed vehicle path 181 to the vehicle 110.

A12. The method 900 of paragraph A11, further comprising determining the grid of attitude constraint masks 123 from environmental sensors 150 disposed onboard the vehicle 110.

A13. The method 900 of paragraph A11, wherein determining the grid of attitude constraint masks 123 includes transmitting environmental sensor data 151 from the vehicle 110 to the excursion planning processor 120, where the excursion planning processor 120 is configured to determine the grid of attitude constraint masks 123 from the environmental sensor data 151, and the method further includes transmitting one or more attitude constraint masks 124 of the grid of attitude constraint masks 123 to the vehicle 110.

A14. The method 900 of paragraph A11, wherein the grid of attitude constraint masks 123 is stored in a memory 122 of the excursion planning processor 120 as a look up table 127.

A15. The method 900 of paragraph A11, wherein the vehicle path 180 is determined in real time.

A16. The method 900 of paragraph A1, wherein determining the vehicle path component 141, of the vehicle path 180, between the two points 290 having the lowest cost includes determining a shortest path 145 satisfying the grid of attitude constraint masks 123.

A17. The method 900 of paragraph A16, wherein the excursion planning processor 120 determines the shortest path 145 by employing one or more of Dijkstra's algorithm 161, Bellman-Ford algorithm 162, A* search algorithm 163, Floyd-Warshall algorithm 164, Johnson's algorithm 165, and Viterbi algorithm 166.

A18. The method 900 of paragraph A1, wherein determining the vehicle path component 141, of the vehicle path 180, between the two points 290 having the lowest cost includes determining a travel path around one or more obstacles 195 where the travel path around the one or more obstacles 195 satisfies the grid of attitude constraint masks 123.

A19. The method 900 of paragraph A1, wherein constructing the vehicle path 180 comprises smoothing the vehicle path 180, where the excursion planning processor 120 smooths the vehicle path 180 by employing one or more of spherical linear interpolation and spherical quadratic interpolation.

A20. The method 900 of paragraph A1, where an attitude constraint 130 changes over time, the method further comprises generating a cumulative mask 125 within the grid of attitude constraint masks 123 by combining, with the excursion planning processor 120, attitude constraint masks 124 of a same type over a predetermined time period.

A21. The method 900 of paragraph A1, where a slew of the vehicle 110 persists over a predetermined period of time, the method further comprises:

using the excursion planning processor (120) to perform the steps of:

generating sets of cumulative masks 126 within the grid of attitude constraint masks 123 by combining attitude constraint masks 124 of a same type over the predetermined time period;

constructing a respective vehicle path 167 for each set 126A in the sets of cumulative masks 126 in one or more of a forward direction 600 from a beginning of the predetermined time period and in a reverse direction 601 from an end of the predetermined time period; and constructing the vehicle path 180 from one or more of the respective vehicle paths 167.

A22. The method 900 of paragraph A21, where the respective vehicle paths 167 of different sets of cumulative masks 126 are connected to each other at any path location that satisfies attitude constraints 130 of the respective set of cumulative masks 126.

B1. A system 100 for controlling a vehicle 110, the system 100 comprising:

an vehicle 110; and an excursion planning processor 120 communicably coupled to the vehicle 110, the excursion planning processor 120 being configured to:

generate a grid of attitude constraint masks 123, wherein each attitude constraint mask 124 corresponds to a respective possible attitude of the vehicle 110, define a distance function 128 between two points 290 on the vehicle path 180 and determine a vehicle path component 141, of the vehicle path 180 between the two points 290, having a selected cost, select a vehicle path 180 in the grid of attitude constraint masks 123 from the vehicle path component 141; and the excursion planning processor 120 is configured to generate an excursion plan 148 so that the vehicle 110 travels along the vehicle path 180.

B2. The system 100 of paragraph B1, wherein the excursion planning processor 120 is configured to define the distance function 128 between the two points 290 on the vehicle path 180 to include a cost for changing a travel direction 129 of the vehicle 110.

B3. The system 100 of paragraph B1, wherein the excursion planning processor 120 is configured to determine if a portion 280 of the vehicle path 180 violates the grid of attitude constraint masks 123, and upon a determination that the portion 280 of the vehicle path 180 violates the grid of attitude constraint masks 123, the excursion planning processor 120 is configured to:

determine at least one next lowest cost path component 147 between the two points 290, re-construct the vehicle path 180 through the grid of attitude constraint masks 123 with the at least one next lowest cost path component 147 and determine if a portion 280A of the reconstructed vehicle path 181 violates the grid of attitude constraint masks 123, and generate the excursion plan 148 so that the vehicle 110 travels along the reconstructed vehicle path 181.

B4. The system 100 of paragraph B3, wherein the excursion planning processor 120 is configured to:

define an alternative cost function 142 when the vehicle path 180 violates the grid of attitude constraint masks 123; and determine the reconstructed vehicle path 181 based on the alternative cost function 142.

B5. The system 100 of paragraph B4, wherein the alternative cost function 142 includes one or more of a shortest duration of violation 143 in which the vehicle path 180 violates an attitude constraint 130 and a shortest total transit time 144.

B6. The system 100 of paragraph B1, wherein excursion planning processor 120 is disposed onboard the vehicle 110 so that the vehicle path 180 is determined by the excursion planning processor 120 onboard the vehicle 110.

B7. The system 100 of paragraph B6, wherein excursion planning processor 120 is configured to determine the vehicle path 180 onboard the vehicle 110 in real time.

B8. The system 100 of paragraph B6, wherein:

an vehicle 110 comprising environmental sensors 150; and the excursion planning processor 120 is configured to determine the grid of attitude constraint masks 123 from the environmental sensors 150 disposed onboard the vehicle 110.

B9. The system 100 of paragraph B6, wherein:

the excursion planning processor 120 comprises an off-board processor 121 and the vehicle 110 comprises a communication system 170 configured to transmit environmental sensor data 151 from the vehicle 110 to the off-board processor 121, where the off-board processor 121 is configured to determine the grid of attitude constraint masks 123 from the environmental sensor data 151; and the off-board processor 121 is configured to transmit one or more attitude constraint masks 124 of the grid of attitude constraint masks 123 to the vehicle 110.

B10. The system 100 of paragraph B6, wherein the grid of attitude constraint masks 123 is stored in a memory 122 of the excursion planning processor 120 as a look up table 127.

B11. The system 100 of paragraph B1, wherein the excursion planning processor 120 is disposed off-board the vehicle 110 so that the vehicle path 180 is determined by the excursion planning processor 120 off-board the vehicle 110, where the excursion planning processor 120 is configured to transmit one or more of the vehicle path 180 or a reconstructed vehicle path 181 to the vehicle 110.

B12. The system 100 of paragraph B11, wherein:
an vehicle 110 comprising environmental sensors 150; and
the excursion planning processor 120 is configured to determine the grid of attitude constraint masks 123 from the environmental sensors 150 disposed onboard the vehicle 110.

B13. The system 100 of paragraph B11, wherein:
the vehicle 110 comprises environmental sensors 150 and a communication system 170 configured to transmit environmental sensor data 151 from the vehicle 110 to the excursion planning processor 120; and
the excursion planning processor 120 is configured to
determine the grid of attitude constraint masks 123 from the environmental sensor data 151, and transmit one or more attitude constraint masks 124 of the grid of attitude constraint masks 123 to the vehicle 110.

B14. The system 100 of paragraph B11, wherein the grid of attitude constraint masks 123 is stored in a memory 122 of the excursion planning processor 120 as a look up table 127.

B15. The system 100 of paragraph B11, wherein the excursion planning processor 120 is configured to determine the vehicle path 180 in real time.

B16. The system 100 of paragraph B 1, wherein the excursion planning processor 120 is configured to determine the vehicle path component 141, of the vehicle path 180, between the two points 290 having the lowest cost by determining a shortest path 145 satisfying the grid of attitude constraint masks 123.

B17. The system 100 of paragraph B16, wherein the excursion planning processor 120 is configured to determine the shortest path 145 by employing one or more of Dijkstra's algorithm 161, Bellman-Ford algorithm 162, A* search algorithm 163, Floyd-Warshall algorithm 164, Johnson's algorithm 165, and Viterbi algorithm 166.

B18. The system 100 of paragraph B 1, wherein the excursion planning processor 120 is configured to determine the vehicle path component 141, of the vehicle path 180, between the two points 290 having the lowest cost by determining a travel path around one or more obstacles 195 where the travel path around the one or more obstacles 195 satisfies the grid of attitude constraint masks 123.

B19. The system 100 of paragraph B 1, wherein the excursion planning processor 120 is configured to construct the vehicle path 180 by smoothing the vehicle path 180, by employing one or more of spherical linear interpolation and spherical quadratic interpolation.

B20. The system 100 of paragraph B1, where an attitude constraint 130 changes over time, the excursion planning processor 120 is configured to generate a cumulative mask 125 within the grid of attitude constraint masks 123 by combining attitude constraint masks 124 of a same type over a predetermined time period.

B21. The system 100 of paragraph B1, where a slew of the vehicle 110 persists over a predetermined period of time, the excursion planning processor 120 is configured to generate sets of cumulative masks 126 within the grid of attitude constraint masks 123 by combining, with the excursion planning processor 120, attitude constraint masks 124 of a same type over the predetermined time period;

construct a respective vehicle path 167 for each set 126A in the sets of cumulative masks 126 in one or more of a forward direction 600 from a beginning of the predetermined time period and in a reverse direction 601 from an end of the predetermined time period; and
construct the vehicle path 180 from one or more of the respective vehicle paths 167.

B22. The system 100 of paragraph B21, where the respective vehicle paths 167 of different sets of cumulative masks 126 are connected to each other at any path location that satisfies attitude constraints 130 of the respective set of cumulative masks 126.

C1. A method 1000 for generation of a vehicle path component 141 for a vehicle 110, the method comprising:
generating a grid of attitude constraint masks 123, wherein each attitude constraint mask 124 corresponds to a respective possible attitude of the vehicle 110;
determining a direct path 189 between two points 290 and determining if intermediate points 298 along a great circle path 299 between the two points 290 violates the grid of attitude constraint masks 123;
wherein:
where the direct path 189 satisfies the grid of attitude constraint masks 123 the excursion planning processor 120 generates an excursion plan 148 so that the vehicle 110 travels along the direct path 189, and
where the direct path 189 violates the grid of attitude constraint masks 132, the method further comprises:
using the excursion planning processor 120 to perform the steps of:
defining a distance function 128 between two points 290 on the vehicle path 180 to include a cost for changing a travel direction 129 of the vehicle 110 and determining a vehicle path component 141, of the vehicle path 180, between the two points 290 having a selected cost;
selecting the vehicle path 180 through the grid of attitude constraint masks 123 from the vehicle path component 141;
determining if a portion 280 of the vehicle path 180 violates the grid of attitude constraint masks 123; and
where the portion 280 of the vehicle path 180 violates the grid of attitude constraint masks 123, using the excursion planning processor 120 to perform the steps of:
determining at least one next lowest cost vehicle path component 147 between the two points 290, and
re-constructing the vehicle path 180 through the grid of attitude constraint masks 123 with the at least one next lowest cost vehicle path component 147 and determining if a portion 280A of the reconstructed vehicle path 181 violates the grid of attitude constraint masks 123; and
generating the excursion plan 148 so that the vehicle 110 travels along the reconstructed vehicle path 181.

C2. The method 1000 of paragraph C1, wherein the vehicle path 180 is determined by the excursion planning processor 120 onboard the vehicle 110.

C3. The method 1000 of paragraph C2, wherein the vehicle path 180 is determined onboard the vehicle 110 in real time.

C4. The method 1000 of paragraph C2, further comprising determining the grid of attitude constraint masks 123 from environmental sensors 150 disposed onboard the vehicle 110.

C5. The method 1000 of paragraph C2, wherein determining the grid of attitude constraint masks 123 includes transmitting environmental sensor data 151 from the vehicle 110 to an off-board processor 121 configured to determine the grid of attitude constraint masks 123 from the environmental sensor data 151, and the method further includes transmitting one or more attitude constraint masks 124 of the grid of attitude constraint masks 123 to the vehicle 110.

C6. The method 1000 of paragraph C2, wherein the grid of attitude constraint masks 123 is stored in a memory 122 of the excursion planning processor 120 as a look up table 127.

C7. The method 1000 of paragraph C1, wherein the vehicle path 180 is determined by the excursion planning processor 120 off-board the vehicle 110 and the method further comprises transmitting one or more of the vehicle path 180 or a reconstructed vehicle path 181 to the vehicle 110.

C8. The method 1000 of paragraph C7, further comprising determining the grid of attitude constraint masks 123 from environmental sensors 150 disposed onboard the vehicle 110.

C9. The method 1000 of paragraph C7, wherein determining the grid of attitude constraint masks 123 includes transmitting environmental sensor data 151 from the vehicle 110 to the excursion planning processor 120, where the excursion planning processor 120 is configured to determine the grid of attitude constraint masks 123 from the environmental sensor data 151, and the method further includes transmitting one or more attitude constraint masks 124 of the grid of attitude constraint masks 123 to the vehicle 110.

C10. The method 1000 of paragraph C7, wherein the grid of attitude constraint masks 123 is stored in a memory 122 of the excursion planning processor 120 as a look up table 127.

C11. The method 1000 of paragraph C7, wherein the vehicle path 180 is determined in real time.

C12. The method 1000 of paragraph C 1, wherein determining the vehicle path component 141, of the vehicle path 180, between the two points 290 having the lowest cost includes determining a shortest path 145 satisfying the grid of attitude constraint masks 123.

C13. The method 1000 of paragraph C12, wherein the excursion planning processor 120 determines the shortest path 145 by employing one or more of Dijkstra's algorithm 161, Bellman-Ford algorithm 162, A* search algorithm 163, Floyd-Warshall algorithm 164, Johnson's algorithm 165, and Viterbi algorithm 166.

C14. The method 1000 of paragraph C1, wherein constructing the vehicle path 180 comprises smoothing the vehicle path 180, where the excursion planning processor 120 smooths the vehicle path 180 by employing one or more of spherical linear interpolation and spherical quadratic interpolation.

C15. The method 1000 of paragraph C1, where an attitude constraint 130 changes over time, the method further comprises generating a cumulative mask 125 within the grid of attitude constraint masks 123 by combining, with the excursion planning processor 120, attitude constraint masks 124 of a same type over a predetermined time period.

C16. The method 1000 of paragraph C1, where a slew of the vehicle 110 persists over a predetermined period of time, the method further comprises:
generating sets of cumulative masks 126 within the grid of attitude constraint masks 123 by combining, with the excursion planning processor 120, attitude constraint masks 124 of a same type over the predetermined time period;
constructing a respective vehicle path 167 for each set 126A in the sets of cumulative masks 126 in one or more of a forward direction 600 from a beginning of the predetermined time period and in a reverse direction 601 from an end of the predetermined time period; and constructing the vehicle path 180 from one or more of the respective vehicle paths 167.

C17. The method 1000 of paragraph C16, where the respective vehicle paths 167 of different sets of cumulative masks 126 are connected to each other at any path location that satisfies attitude constraints 130 of the respective set of cumulative masks 126.

C18. The method 1000 of paragraph C1, further comprising:
defining an alternative cost function 142 with the excursion planning processor 120 when the vehicle path 180 violates the grid of attitude constraint masks 123; and
determining the reconstructed vehicle path 181 based on the alternative cost function 142.

C19. The method 1000 of paragraph C18, wherein the alternative cost function 142 includes one or more of a shortest duration of violation 143 in which the vehicle path 180 violates an attitude constraint 130 and a shortest total transit time 144.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for generation of a vehicle path for a vehicle, the method comprising:
using an excursion planning processor to perform the steps of:
generating a grid of attitude constraint masks, wherein each attitude constraint mask corresponds to a respective possible attitude of the vehicle and is a two-dimensional representation of an operational space of the vehicle and represents two of three axes of the vehicle, where a separate attitude constraint mask is created for each value of a third of the three axes of the vehicle to generate the grid of attitude constraints masks, wherein the three axes comprise roll, pitch, and yaw of the vehicle;
defining a distance function between two points on a vehicle path, such that the vehicle path defines a change in orientation of the vehicle;
determining a vehicle path component, of the vehicle path, between the two points having a selected cost;
selecting a vehicle path in the grid of attitude constraint masks from the vehicle path component; and
generating an excursion plan so that the vehicle travels along the vehicle path.

2. The method of claim 1, wherein the distance function between the two points on the vehicle path is defined to include a cost for changing a travel direction of the vehicle.

3. The method of claim 1, further comprising:
determining if a portion of the vehicle path violates the grid of attitude constraint masks, and where the portion of the vehicle path violates the grid of attitude constraint masks, using the excursion planning processor to perform the steps of:
determining a next lowest cost vehicle path component between the two points, and
re-constructing the vehicle path through the grid of attitude constraint masks with the next lowest cost vehicle path component and determine if a portion of the reconstructed vehicle path violates the grid of attitude constraint masks; and
generating the excursion plan so that the vehicle travels along the reconstructed vehicle path.

4. The method of claim 3, further comprising:
defining an alternative cost function with the excursion planning processor when the vehicle path violates the grid of attitude constraint masks; and
determining the reconstructed vehicle path based on the alternative cost function.

5. The method of claim 1, wherein the vehicle path is determined by the excursion planning processor onboard the vehicle.

6. The method of claim 5, further comprising determining the grid of attitude constraint masks from environmental sensors disposed onboard the vehicle.

7. The method of claim 5, wherein the grid of attitude constraint masks is stored in a memory of the excursion planning processor as a look up table.

8. The method of claim 1, wherein the vehicle path is determined by the excursion planning processor off-board the vehicle and the method further comprises transmitting one or more of the vehicle path or a reconstructed vehicle path to the vehicle.

9. The method of claim 1, wherein determining the at least one constrained cost-optimized vehicle path component, of the vehicle path, between the two points having the lowest cost includes determining a shortest path satisfying the grid of attitude constraint masks.

10. The method of claim 1, wherein determining the at least one constrained cost-optimized vehicle path component, of the vehicle path, between the two points having the lowest cost includes determining a travel path around one or more obstacles where the travel path around the one or more obstacles satisfies the grid of attitude constraint masks.

11. The method of claim 1, where an attitude constraint changes over time, the method further comprises generating a cumulative mask within the grid of attitude constraint masks by combining, with the excursion planning processor, attitude constraint masks of a same type over a predetermined time period.

12. The method of claim 1, where a slew of the vehicle persists over a predetermined period of time, the method further comprises:
generating sets of cumulative masks within the grid of attitude constraint masks by combining, with the excursion planning processor, attitude constraint masks of a same type over the predetermined time period;
constructing a respective vehicle path for each set in the sets of cumulative masks in one or more of a forward direction from a beginning of the predetermined time period and in a reverse direction from an end of the predetermined time period; and
constructing the vehicle path from one or more of the respective vehicle paths.

13. A system for controlling a vehicle, the system comprising:
a vehicle; and
an excursion planning processor communicably coupled to the vehicle, the excursion planning processor being configured to:
generate a grid of attitude constraint masks, wherein each attitude constraint mask corresponds to a respective possible attitude of the vehicle and is a two-dimensional representation of an operational space of the vehicle and represents two of three axes of the vehicle, where a separate attitude constraint mask is created for each value of a third of the three axes of the vehicle to generate the grid of attitude constraints masks, wherein the three axes comprise roll, pitch, and yaw of the vehicle,
define a distance function between two points on the vehicle path,
determine a vehicle path component, of the vehicle path, between the two points, having a selected cost,
select a vehicle path in the grid of attitude constraint masks from the vehicle path component; and
the excursion planning processor is configured to generate an excursion plan so that the vehicle travels along the vehicle path.

14. The system of claim 13, wherein the excursion planning processor is configured to determine if a portion of the vehicle path violates the grid of attitude constraint masks, and upon a determination that the portion of the vehicle path violates the grid of attitude constraint masks, the excursion planning processor is configured to:
determine a next lowest cost vehicle path component between the two points,
re-construct the vehicle path through the grid of attitude constraint masks with the next lowest cost vehicle path component and determine if a portion of the reconstructed vehicle path violates the grid of attitude constraint masks, and
generate the excursion plan so that the vehicle travels along the reconstructed vehicle path.

15. The system of claim 14, wherein the excursion planning processor is configured to:
define an alternative cost function when the vehicle path violates the grid of attitude constraint masks; and
determine the reconstructed vehicle path based on the alternative cost function.

16. The system of claim 13, wherein the excursion planning processor is disposed onboard the vehicle so that the vehicle path is determined by the excursion planning processor onboard the vehicle.

17. The system of claim 16, wherein:
the excursion planning processor comprises an off-board processor and the vehicle comprises a communication system configured to transmit environmental sensor data from the vehicle to the off-board processor, where the off-board processor is configured to determine the grid of attitude constraint masks from the environmental sensor data; and
the off-board processor is configured to transmit one or more attitude constraint masks of the grid of attitude constraint masks to the vehicle.

18. A method for generation of a vehicle path component for a vehicle, the method comprising:
using an excursion planning processor to perform the steps of:
generating a grid of attitude constraint masks, wherein each attitude constraint mask corresponds to a respective possible attitude of the vehicle and is a two-dimensional representation of an operational space of the vehicle and represents two of three axes of the vehicle, where a separate attitude constraint mask is created for each value of a third of the three axes of the vehicle to generate the grid of attitude constraints masks, wherein the three axes comprise roll, pitch, and yaw of the vehicle;
determining a direct path between two points and determining if intermediate points along a great circle path between the two points violates the grid of attitude constraint masks;
wherein:
where the direct path satisfies the grid of attitude constraint masks the excursion planning processor generates an excursion plan so that the vehicle travels along the direct path, and
where the direct path violates the grid of attitude constraint masks, the method further comprises:
using the excursion planning processor to perform the steps of:
defining a distance function between two points on the vehicle path to include a cost for changing a travel direction of the vehicle and determining a vehicle path component, of the vehicle path, between the two points having a selected cost;
selecting the vehicle path through the grid of attitude constraint masks from the vehicle path component;
determining if a portion of the vehicle path violates the grid of attitude constraint masks; and
where the portion of the vehicle path violates the grid of attitude constraint masks, using the excursion planning processor to perform the steps of:

determining at least one next lowest cost vehicle path component between the two points, and re-constructing the vehicle path through the grid of attitude constraint masks with the at least one next lowest cost vehicle path component and determining if a portion of the reconstructed vehicle path violates the grid of attitude constraint masks; and generating the excursion plan so that the vehicle travels along the reconstructed vehicle path.

19. The method of claim 18, wherein constructing the vehicle path comprises smoothing the vehicle path, where the excursion planning processor smooths the vehicle path by employing one or more of spherical linear interpolation and spherical quadratic interpolation.

20. The method of claim 18, further comprising:

defining an alternative cost function with the excursion planning processor when the vehicle path violates the grid of attitude constraint masks; and determining the reconstructed vehicle path based on the alternative cost function.

* * * * *